July 14, 1964 L. M. GRISWOLD 3,140,720
FLUID DISTRIBUTION CONTROL SYSTEM
Filed Jan. 24, 1961 12 Sheets-Sheet 1

INVENTOR.
Lee M. Griswold
BY
Bacon & Thomas
ATTORNEYS

July 14, 1964  L. M. GRISWOLD  3,140,720
FLUID DISTRIBUTION CONTROL SYSTEM
Filed Jan. 24, 1961  12 Sheets-Sheet 2
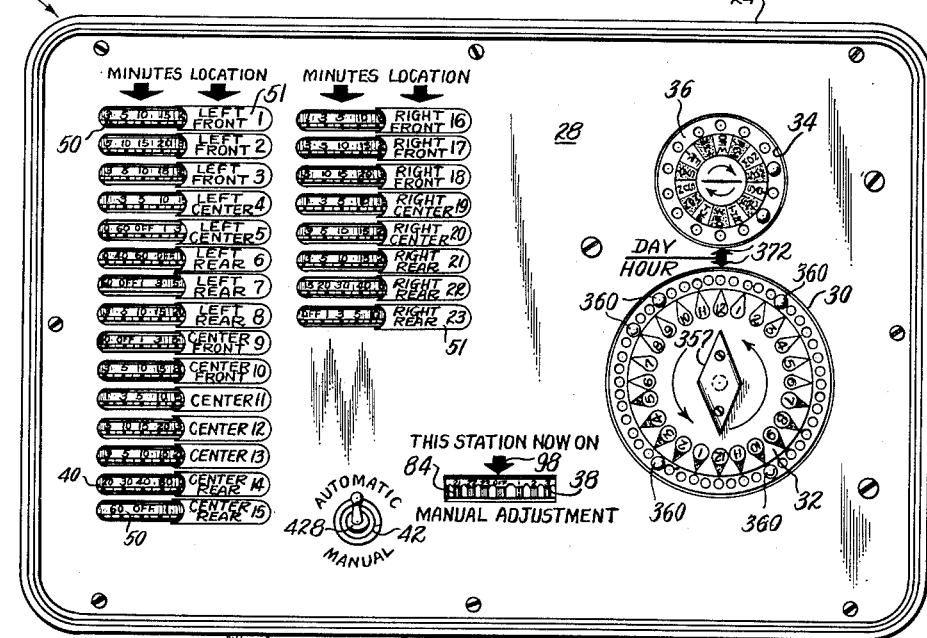
*Fig. 2.*
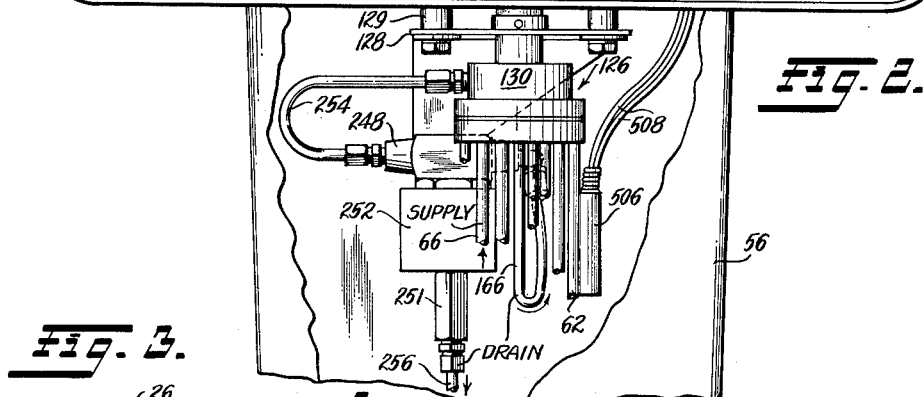
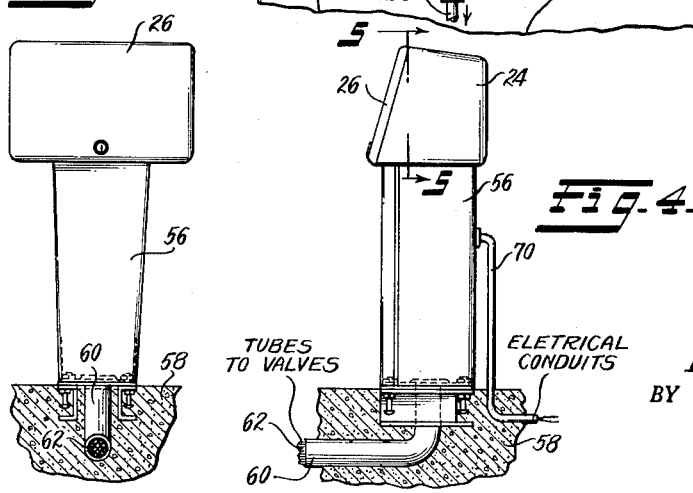
*Fig. 3.*
*Fig. 4.*
INVENTOR.
Lee M. Griswold
BY
Bacon & Thomas
ATTORNEYS July 14, 1964  L. M. GRISWOLD  3,140,720
FLUID DISTRIBUTION CONTROL SYSTEM
Filed Jan. 24, 1961  12 Sheets-Sheet 3
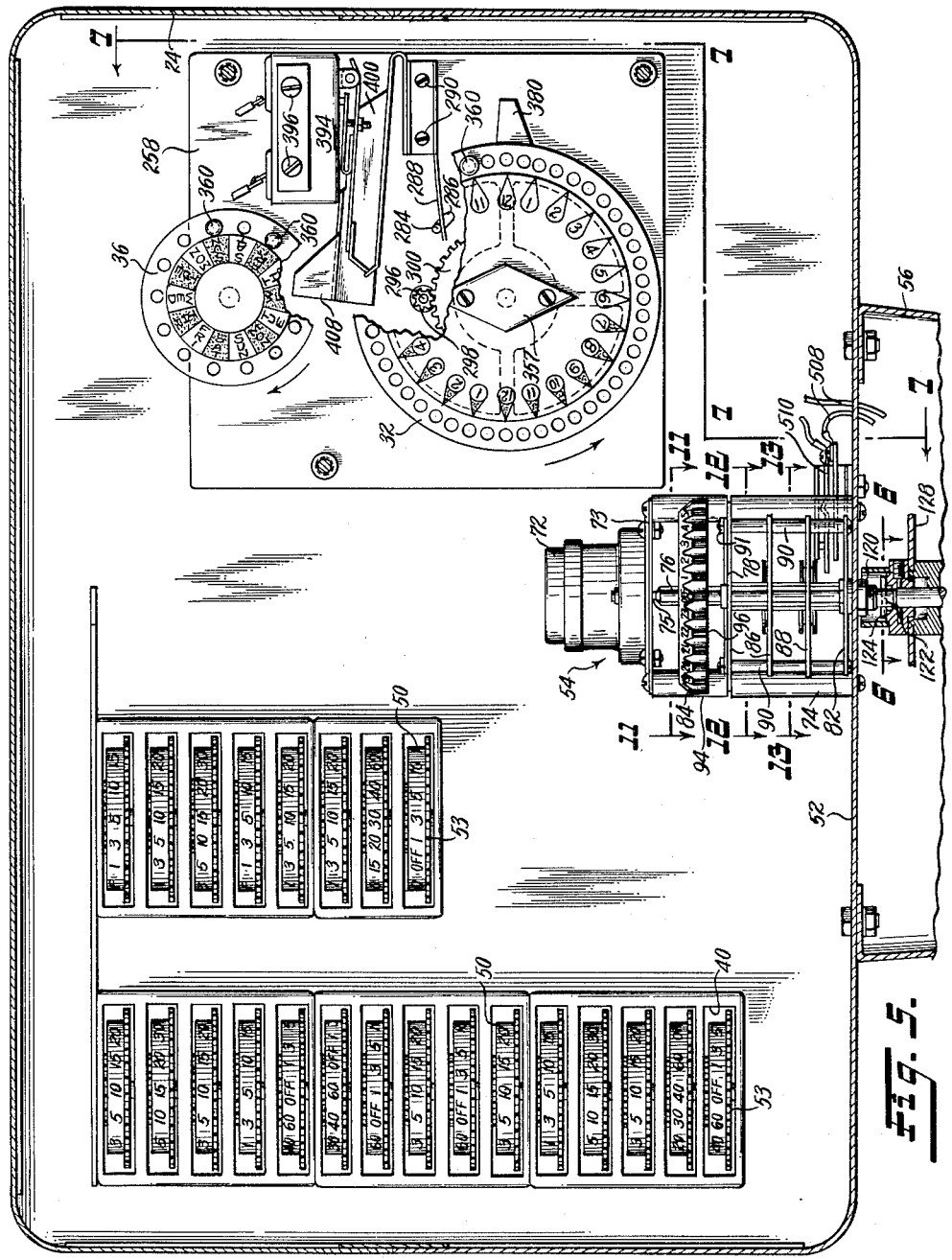
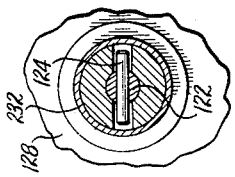
INVENTOR.
*Lee M. Griswold*
BY
*Bacon & Thomas*
ATTORNEYS

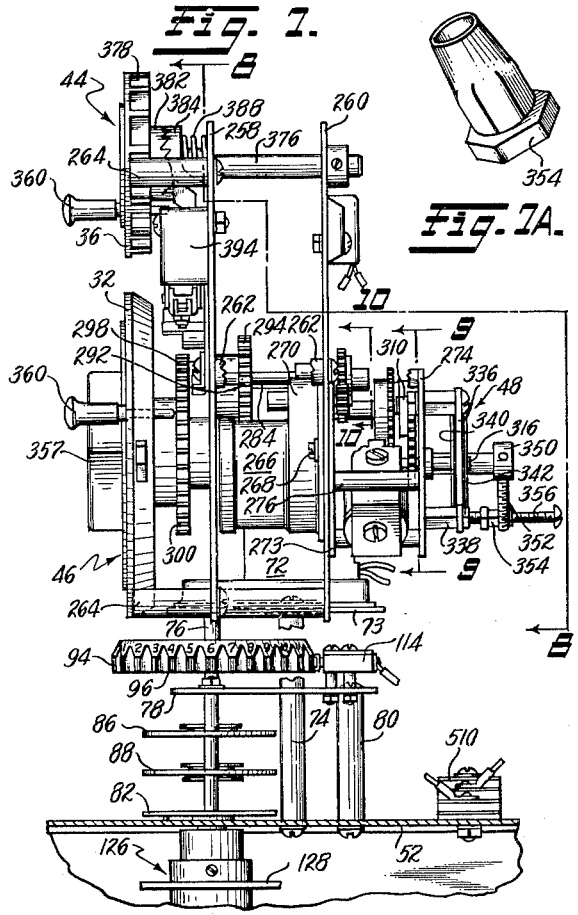
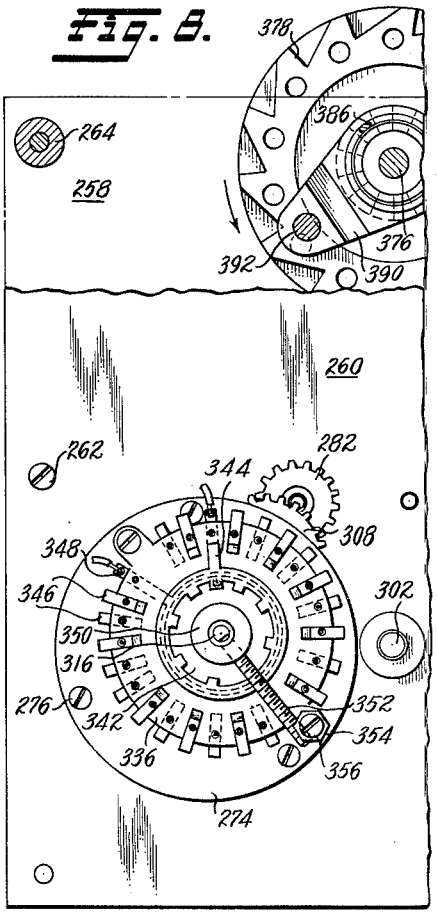
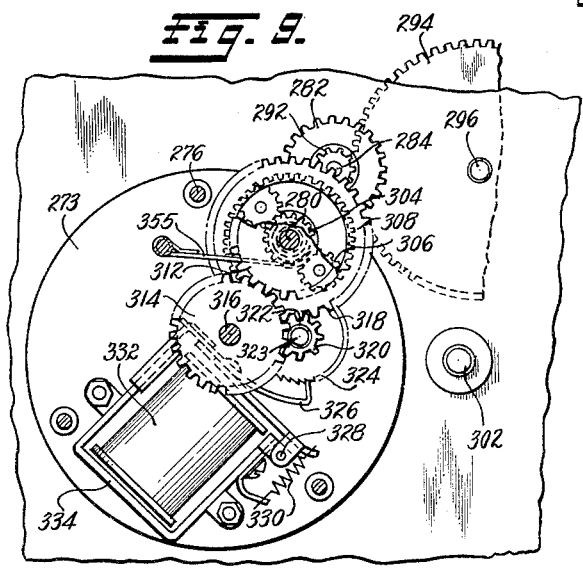
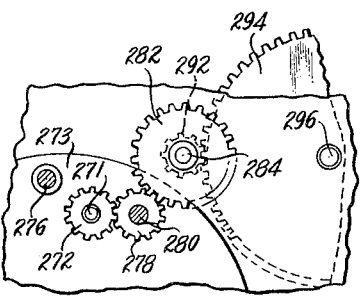
INVENTOR.
Lee M. Griswold
BY
Bacon & Thomas
ATTORNEYS July 14, 1964   L. M. GRISWOLD   3,140,720
FLUID DISTRIBUTION CONTROL SYSTEM
Filed Jan. 24, 1961   12 Sheets-Sheet 5
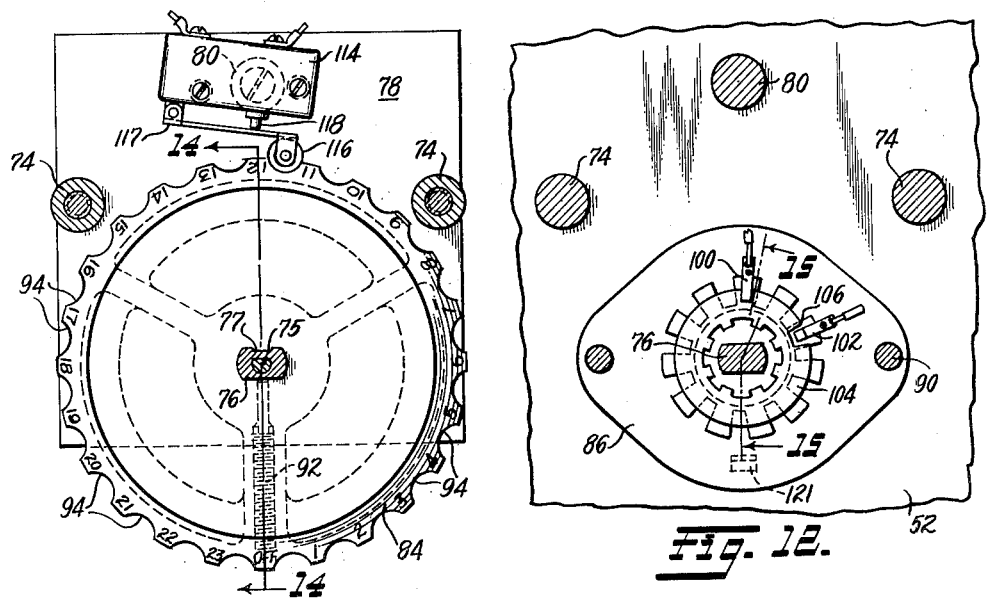
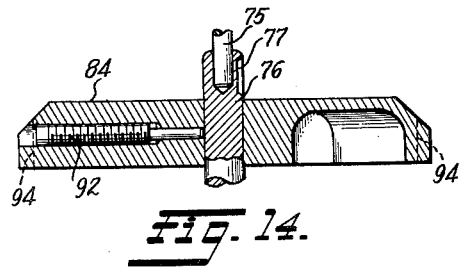
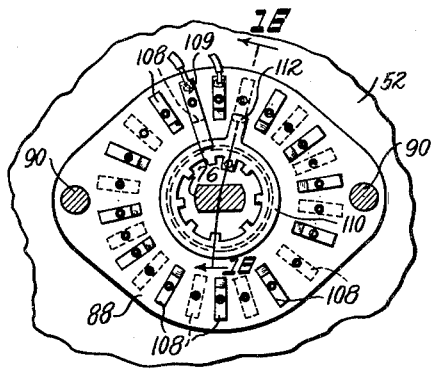
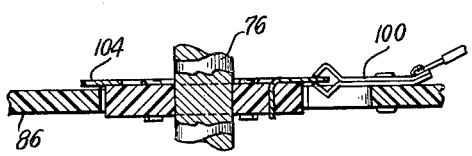
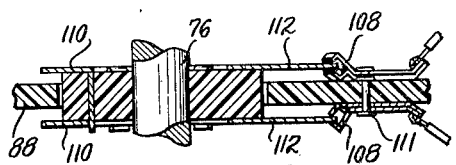
INVENTOR.
Lee M. Griswold
BY
Bacon & Thomas
ATTORNEYS July 14, 1964
L. M. GRISWOLD
3,140,720
FLUID DISTRIBUTION CONTROL SYSTEM
Filed Jan. 24, 1961
12 Sheets-Sheet 6
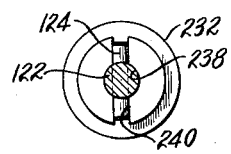
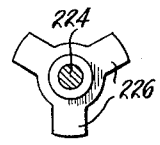
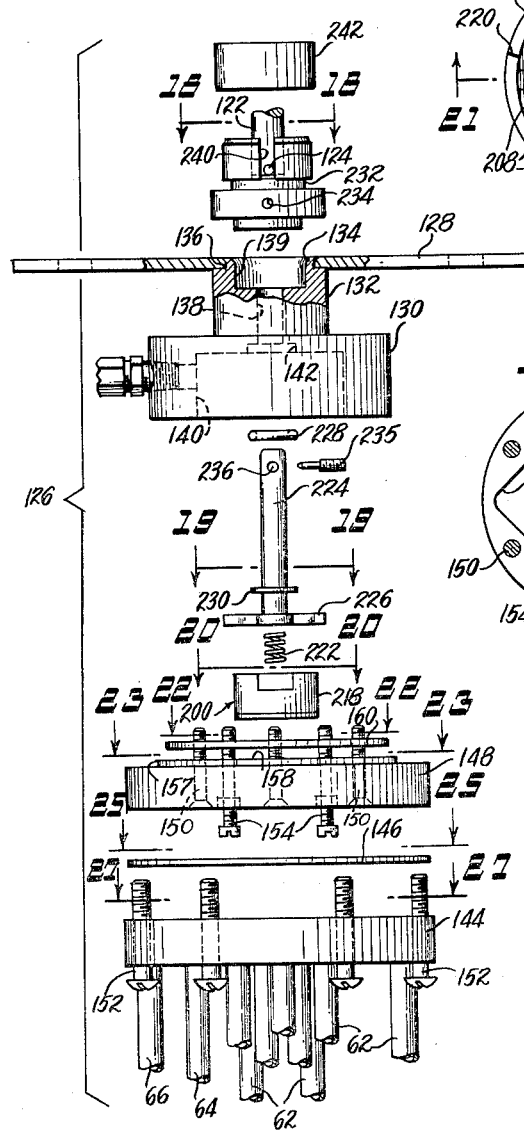
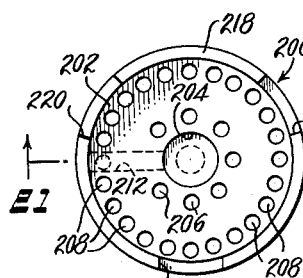
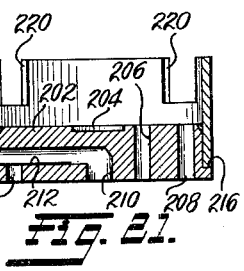
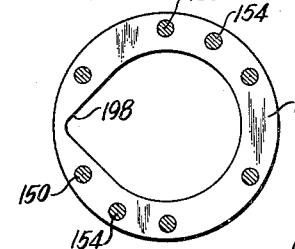
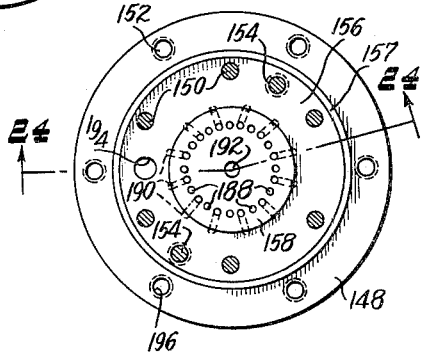
INVENTOR.
Lee M. Griswold
BY
Bacon & Thomas
ATTORNEYS July 14, 1964 L. M. GRISWOLD 3,140,720
FLUID DISTRIBUTION CONTROL SYSTEM
Filed Jan. 24, 1961 12 Sheets-Sheet 7
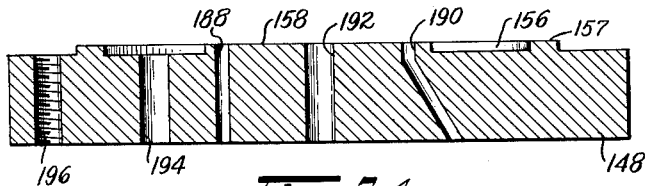
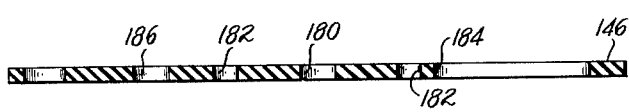
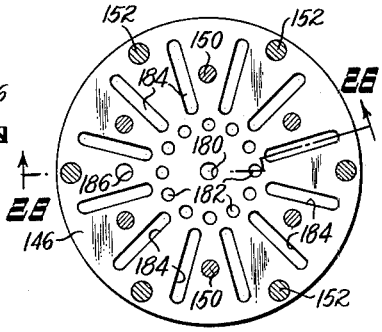
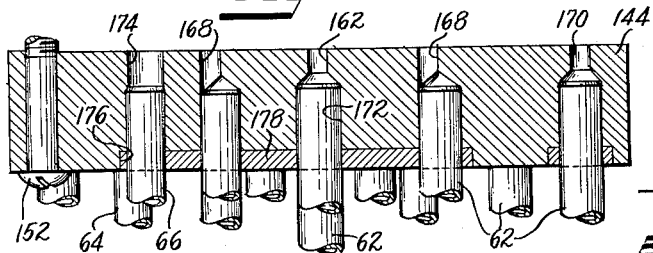
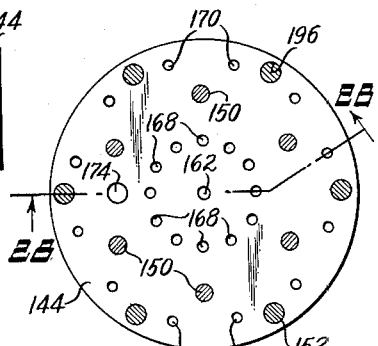
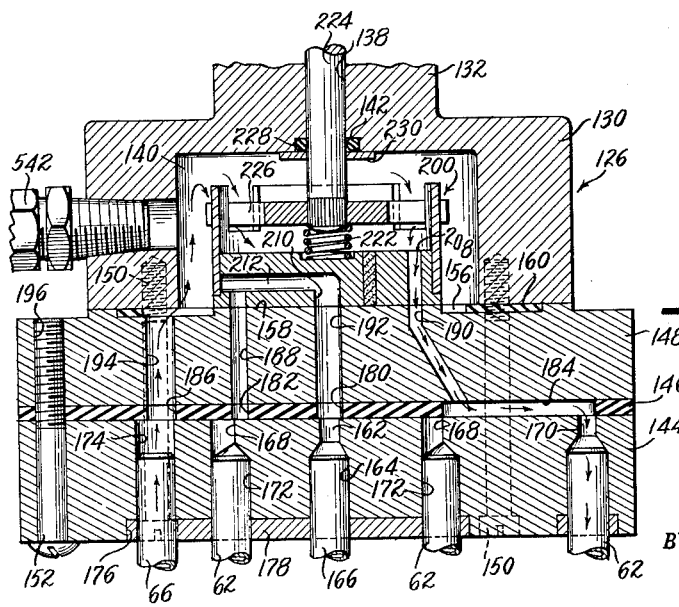
INVENTOR.
Lee M. Griswold
BY
Bacon & Thomas
ATTORNEYS July 14, 1964
L. M. GRISWOLD
3,140,720
FLUID DISTRIBUTION CONTROL SYSTEM
Filed Jan. 24, 1961
12 Sheets-Sheet 8
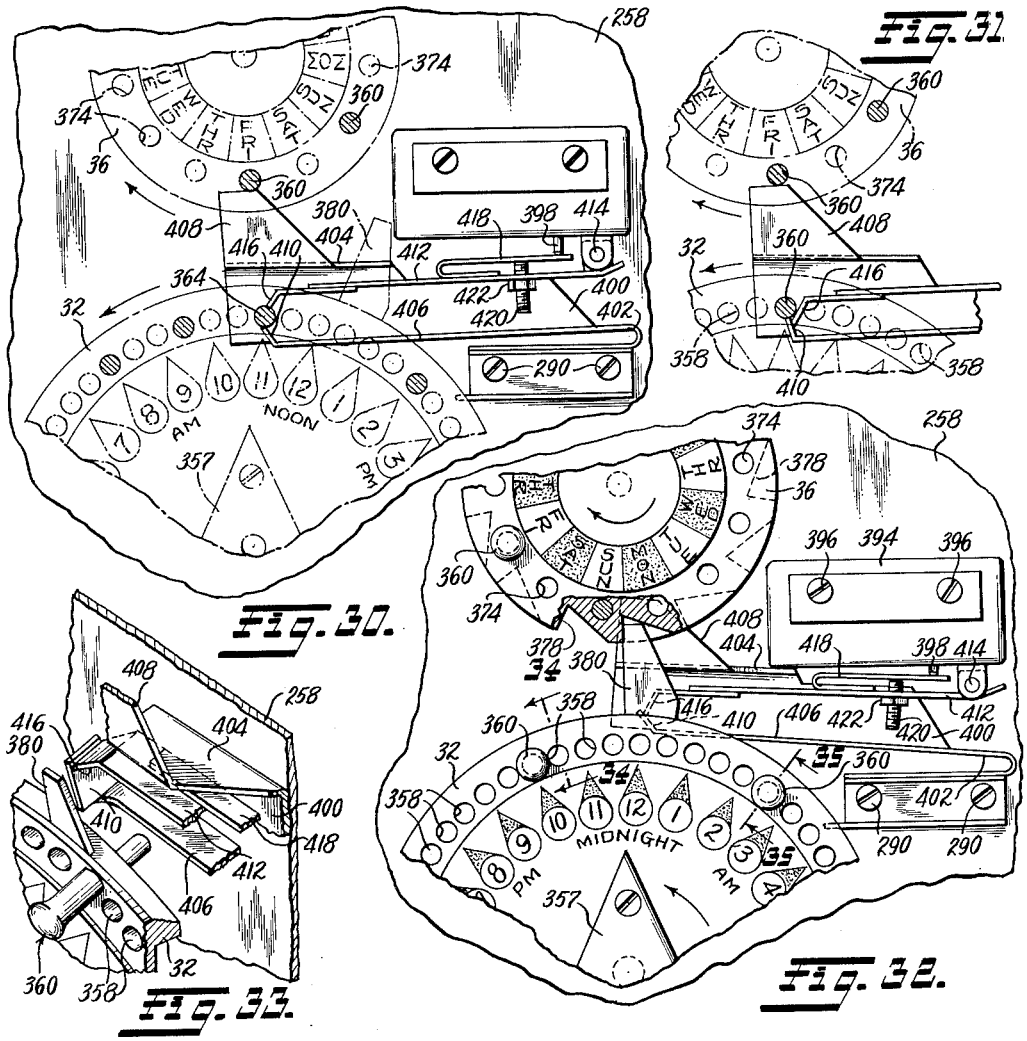
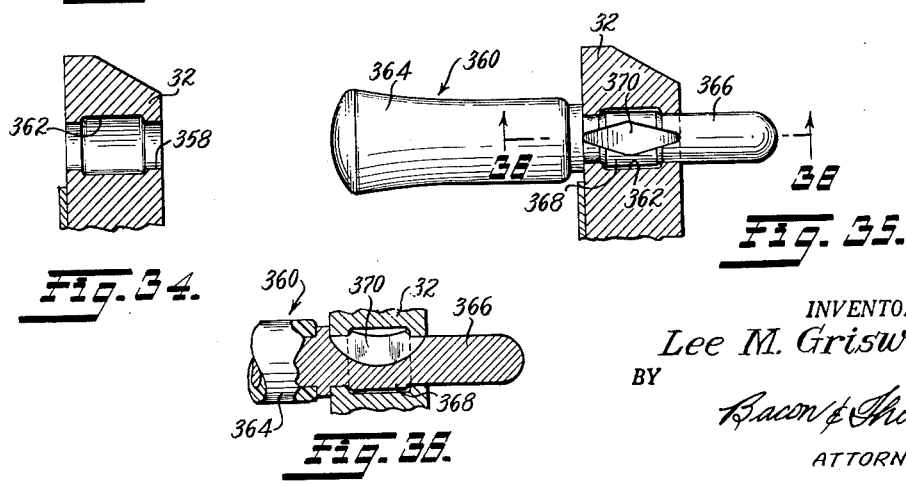
INVENTOR.
Lee M. Griswold
BY
Bacon & Thomas
ATTORNEYS

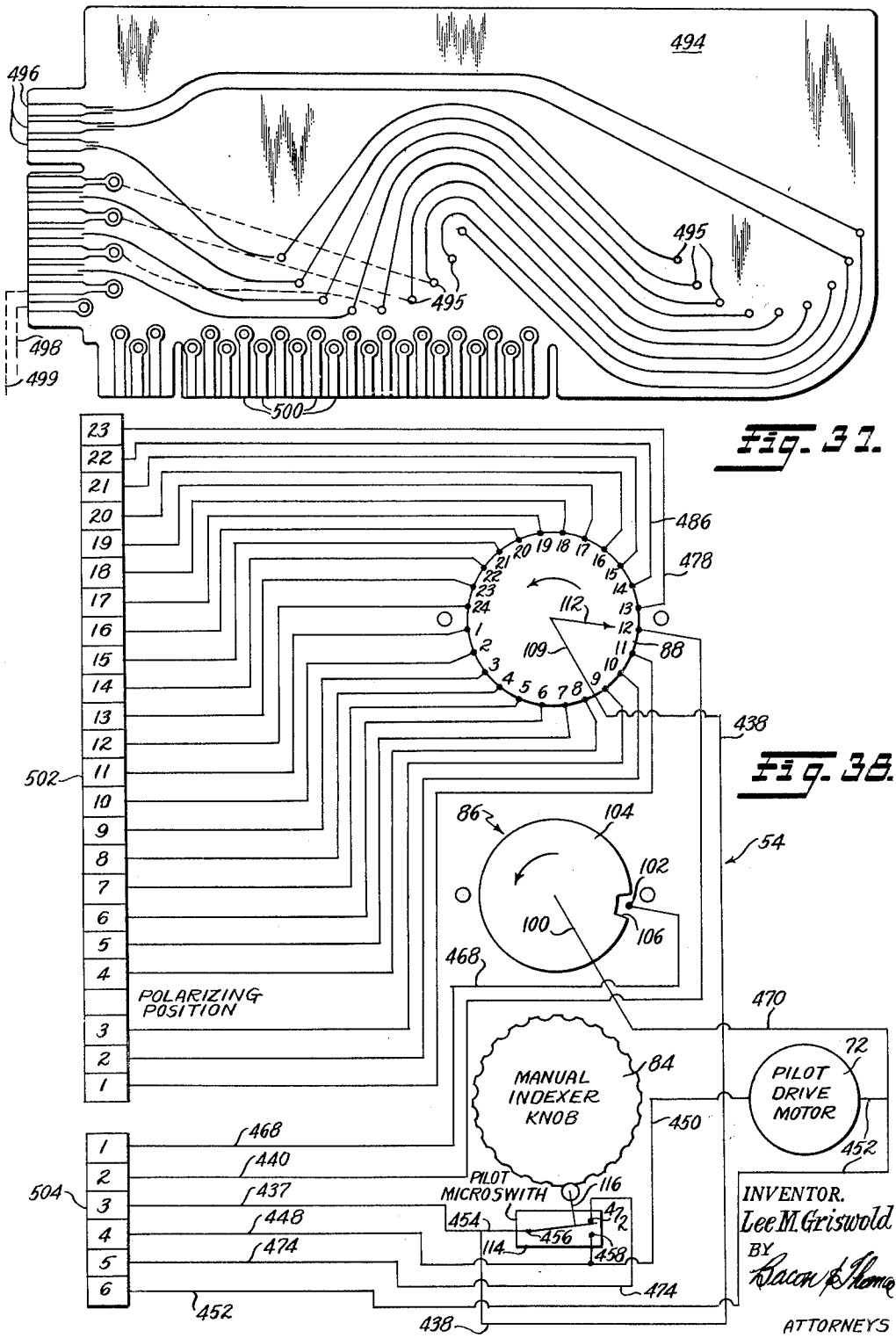

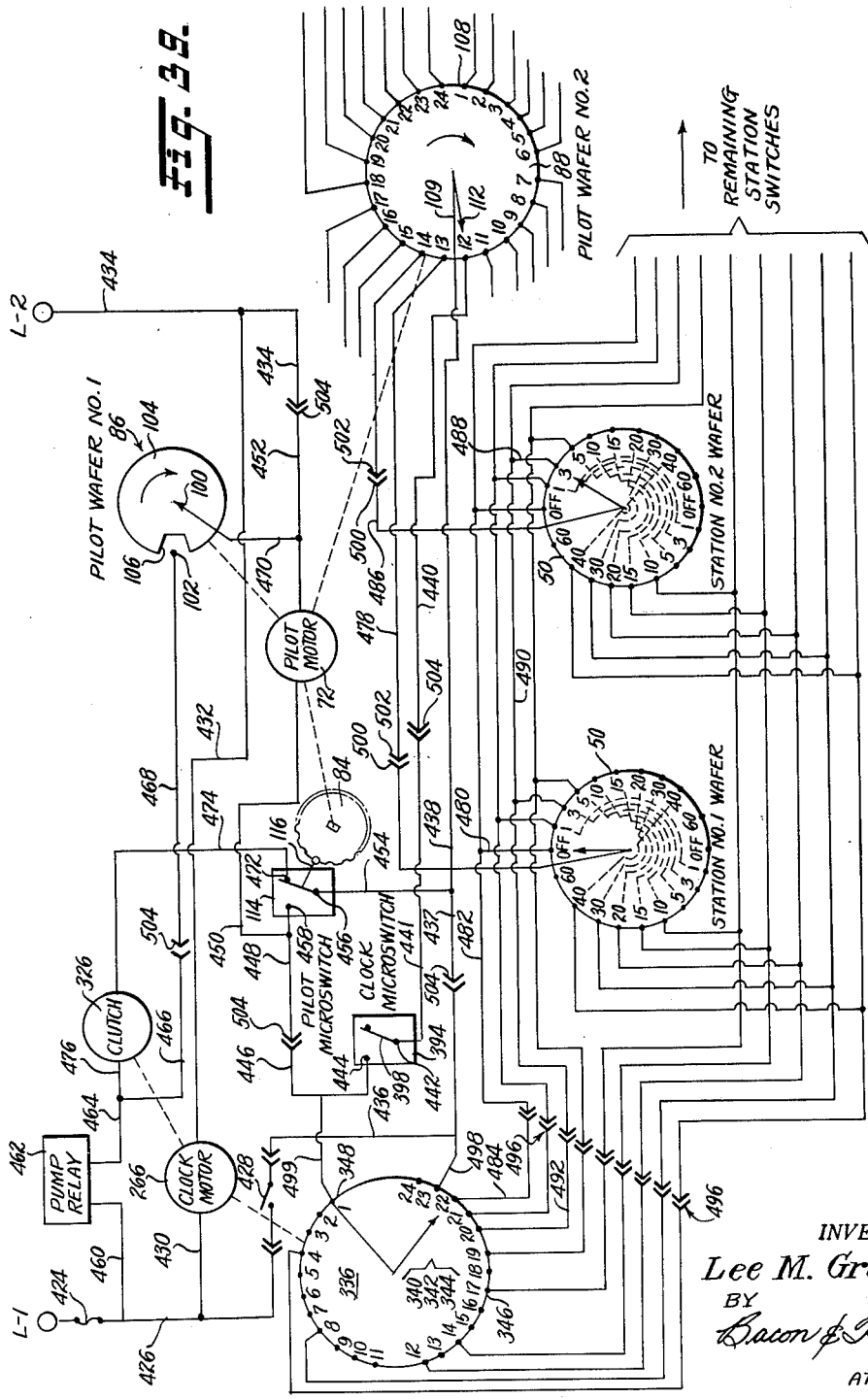

July 14, 1964
L. M. GRISWOLD
3,140,720
FLUID DISTRIBUTION CONTROL SYSTEM
Filed Jan. 24, 1961
12 Sheets-Sheet 11
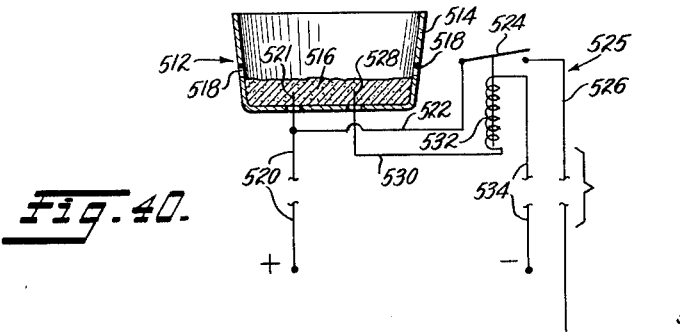
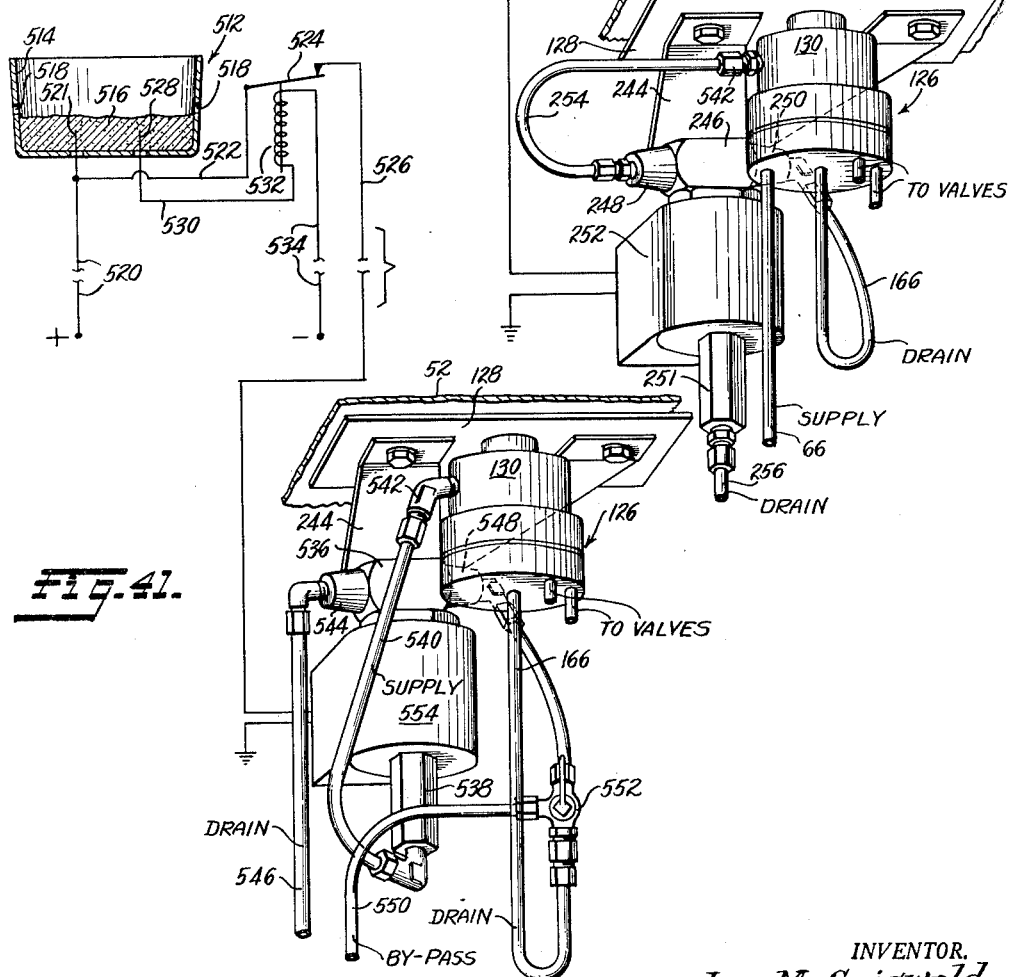
INVENTOR.
Lee M. Griswold
BY
Bacon & Thomas
ATTORNEYS

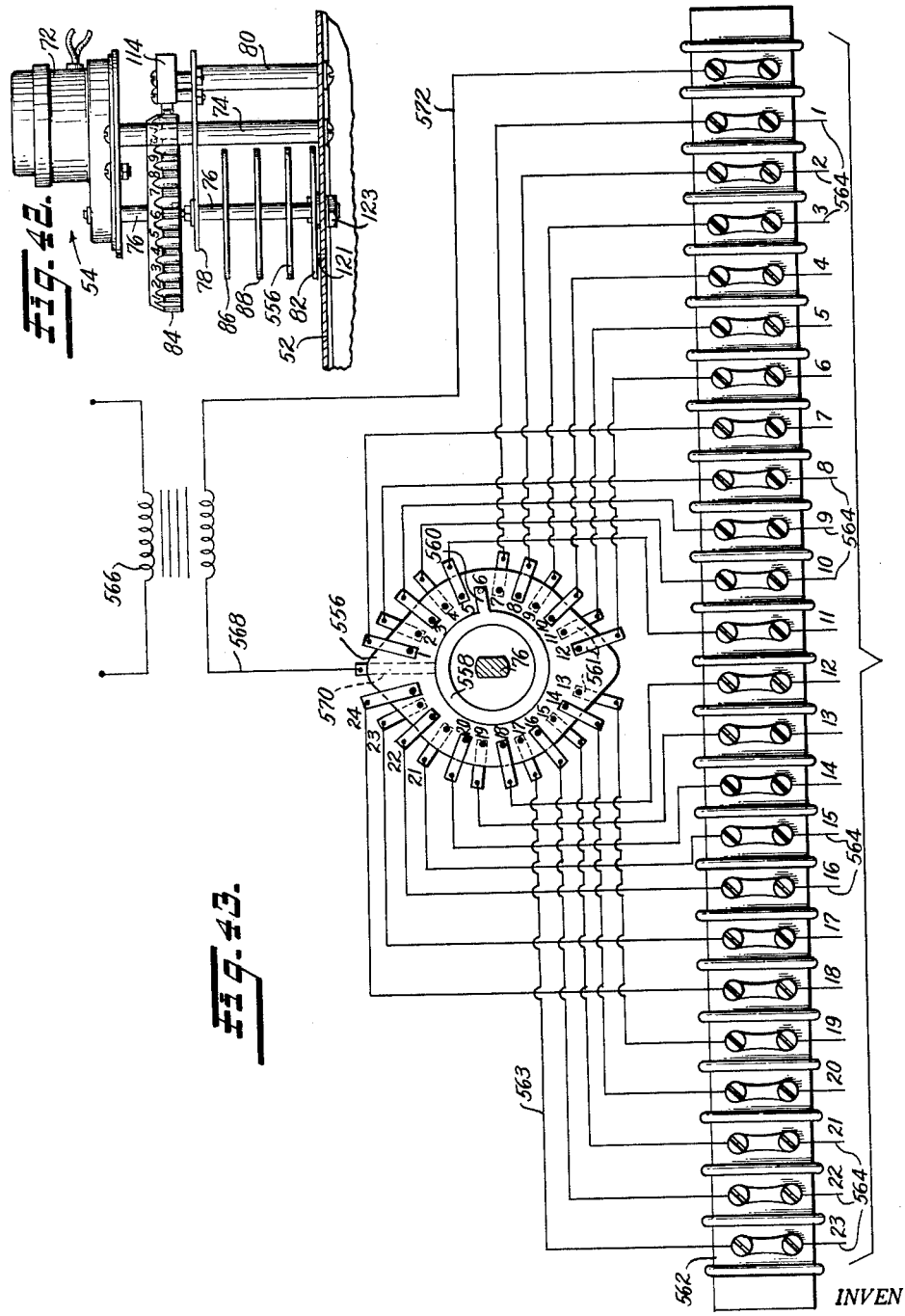

United States Patent Office 3,140,720
Patented July 14, 1964

3,140,720
FLUID DISTRIBUTION CONTROL SYSTEM
Lee M. Griswold, Pasadena, Calif., assignor to Donald
G. Griswold, Newport Beach, Calif.
Filed Jan. 24, 1961, Ser. No. 89,088
27 Claims. (Cl. 137—59)

This invention relates to automatic control means for cyclically controlling the distribution of fluid, and more specifically to a multiple control unit for irrigation or lawn sprinkling systems which makes it possible to schedule flow at any one station or area at any given hour, any number of times, and for any length of time, on a predetermined daily schedule as desired.

Automatic irrigation systems and sprinkling systems for lawns and the like generally include ditches supplying certain areas, or sprinkler heads distributed throughout the lawn or shrubbery area, and in many instances the areas to be watered are of such extent that the usual water supply pipes are unable to provide sufficient pressure and volume of flow to supply all of the ditches or to operate all of the sprinkler heads simultaneously. It is customary, therefore, to arrange the irrigation ditches or sprinklers in groups, each group being located to water a selected area. Usually each group of ditches or sprinklers is supplied by a single distribution pipe. The several distribution pipes are connected to a main supply line and controlled by separate fluid pressure-actuated diaphragm valves, or solenoid-operated valves, that are selectively and successively operated to allow flow of water to any one of the distribution pipes. It is often desirable in irrigating areas to vary the time interval of watering to suit conditions or to suit particular landscaping.

According to the present invention, water to any given area may be supplied at any time of the day or night for any desired time interval, from 1 minute to about an hour or more. It is also possible, with the present control unit, to plan a predetermined calendar schedule of watering, which may call for watering only on certain days instead of daily.

The fluid pressure-operated valves or solenoid-operated valves controlling the flow of water to the ditches or sprinklers in different areas are themselves controlled by a station selector, which in the present control is a disk-type pilot valve, or a rotary selector switch, operated in response to schedules determined by program dials driven by electric time clock mechanism to preselect the time at which a given distribution pipe will be supplied with water and to predetermine the length of time of supply of water to the given pipe. The present control units can be preset to determine the time or times of day or night and the days of the week when the watering system is to be set into operation. Often it is preferred to water during the early hours of the morning when the demand on the water mains is least. Any predetermined watering cycle may be repeated several times without interruption, if desired, within any 24-hour period, and from day to day.

Also, according to the present invention, the control units may be set to effect watering on any preselected day or days of a 2-week period, after which the whole cycle is repeated. For example, the control may be set to effect watering only on Monday and Thursday of one week and Tuesday and Friday of the next week.

The station selector switch or pilot valve is subject to control by an electric clock-driven program dial rigged to actuate a "TIME" or switch actuating arm to close a daily program switch to effect energization of a rotary-type motor for intermittently turning the pilot disk or the rotary switch, step by step, through a complete revolution or cycle of operation.

The present control also includes an interceptor, or shut-off valve, in the control system for the line flow control valves. This interceptor valve is a solenoid-actuated, three-way valve arranged so that it will effect automatic closing of any open flow control valve independently of any control by the pilot valve. In other words, the actuation of the interceptor valve will cause closing of any line flow control valve which is then in an open position permitted by the operation of the pilot valve during a sprinkler cycle. In one system, the solenoid of the interceptor valve is connected in a circuit including a precipitation sensing device to energize the solenoid, in response to a predetermined amount of precipitation, to actuate the interceptor valve to close any line flow control valve which is open.

In another system, controlling the interceptor valve in response to precipitation and/or power failure, the solenoid of the interceptor valve is connected in a circuit, including the precipitation sensing device and a relay, and wherein the solenoid of the interceptor valve and the solenoid of said relay are both normally energized, but are adapted to be deenergized to actuate the interceptor valve to close any line flow control valve that is open, in the event of a predetermined amount of precipitation, or in the event of power failure, or both.

The invention also contemplates a series of manually adjustable switches, one for each station, the switches being mounted on the control panel, and each switch having timing indicia thereon. Each switch is electrically connected in a timing circuit and each may be manually adjusted to determine the duration of sprinkling at that particular station, or to skip sprinkling, as desired. These switches may be set at any time, even during a sprinkling cycle, without interrupting the cycle, and without changing the setting of other switches for other stations.

The present control also includes a 14-day calendar dial, by means of which the days on which watering is to occur can be preselected by mounting program pins at appropriate points on the dial. One or more pins, associated with a daily program dial, are arranged to actuate, in cooperation with the pins in the calendar dial, a cycle initiating switch.

The pilot valve, when used in a system, directs line pressure to selected water distribution control valves to effect watering of area by area, or station by station. Similarly, in an electrical valve control system, a rotary switch effects operation of solenoid-actuated valves for the same purpose. A conventional rotary motor drives, through a one-way clutch, a shaft that advances the disk of the pilot valve or the rotary switch step-by-step, there being means provided to temporarily stop the motor between each step. In the event of power failure, the selector control (pilot valve) can be advanced by turning a dial manually to rotate the pilot disk step by step.

The manual control may also be used to skip watering of certain areas and advance the cycle to any desired point. The 3-way interceptor valve is arranged so that when it is deenergized, spent operating fluid from a distribution valve that is allowed to open is exhausted through it. Upon energization of the interceptor valve, line pressure is directed to the pressure chamber of the open line valve and causes it to close without requiring any actuation or change in position of the disk of the pilot valve. The interceptor valve responds to electrical impulses received through the control switch. In another arrangement, the deenergization of the interceptor valve, responsive to power failure, causes closing of the open line valve without requiring any actuation or change in position of the pilot valve disk.

The program clock includes a rotatable clock-face or daily program dial disposed within an opening in a panel. The dial has two sets of equally spaced numerals from 1 to 12 positioned at its periphery to indicate each hour in a day and night, respectively. The dial also has a series of circumferentially spaced pin-receiving holes, one at each hour numeral and one between each two adjacent numerals.

The calendar wheel itself is provided with evenly spaced openings adapted to receive pins that engage and actuate a switch arm. The calendar wheel is calibrated into fourteen divisions, including two series, each reading SUN., MON., TUE., WED., THR., FRI. and SAT., each division including one of the aforesaid pin-receiving openings. A pin on the clock or daily program dial is arranged to actuate, in cooperation with a pin on the calendar wheel, a switch to initiate a watering cycle.

A toggle switch is mounted on the panel and, when in its OFF position, interrupts the circuit to both the motor-operated pilot valve (or the solenoid-operated control valves) and the solenoid-operated interceptor valve. Manual actuation of the pilot valve is permitted when the switch is in either its ON or OFF position.

The invention also includes a timer which is automatically effective each time a watering station control valve is opened, to determine the duration of the interval of opening of that valve.

One of the features of the invention is that the control makes it possible to set a completely different watering schedule on the program dials for each station. Moreover, such schedule is adjustable to operate from one or more times each day, and on any day or days of a two-week period. The entire two-week schedule and the length of "ON" time for any valve, on any day, is readily visible on the daily program and calendar dials.

The principal object of the invention is to provide an automatic, versatile fluid distribution control apparatus that will effect flow through preselected pipes, in predetermined sequence, and for selective variable time intervals, and which is also capable of adjustment to skip flow through certain pipes and to effect flow through other pipes for any desired time interval.

A more specific object is to provide a control unit for an irrigation or sprinkler system that can be pre-set to effect flow through preselected distribution pipes to given areas, in predetermined sequence, for predetermined time intervals, for preselected days, and which can be pre-set to skip watering on other days.

Another object is to provide an automatic control for an irrigation or sprinkler system that will make it possible to set up schedules of watering programs for a two-week interval, which will repeat indefinitely until altered.

Another object is to provide an automatic control for an irrigation or sprinkler system wherein any desired number of watering cycles may be set up for different times on each day of the week.

Another object is to provide automatic control means for an irrigation or sprinkler system wherein a watering control valve can be closed notwithstanding that the station selector control (pilot valve or switch disk) may be in a position that would normally effect watering.

Another object is to provide an irrigation or sprinkler control device that may be operated manually in the event of power failure, and wherein any given cycle may be advanced manually to omit distribution of water to one or more areas, if desired.

Another object is to provide an automatic control unit for a pilot-valve-controlled sprinkler system, which will visually indicate the position of the disk of the pilot valve and the corresponding station at which watering is taking place.

Another object is to provide an irrigation or sprinkler control unit that will visually indicate a watering schedule set up for at least a two-week period.

Another object is to provide an irrigation or sprinkler control unit which operates automatically to skip watering in the event of a power failure, or in the event of precipitation in excess of a minimum amount.

Still another object is to provide a novel timer switch which can easily be changed to provide time controlling signals varying from one minute to an hour or more, and which is automatically reset at the termination of each timing operation.

Still another object is to provide a novel fluid distributing valve useful as a pilot valve, and which is compact but still permits the control of fluid to a large number of distributing conduits.

Still another object of the invention is to provide a heating element disposed in heat exchange relation with the pressure ducts between the pilot valve and the flow control valves, and a temperature sensing means which senses the ambient temperature, and is effective to energize the heating element to prevent freezing of the water in the pressure ducts.

Other objects and features of the invention will become apparent from the following description taken in conjunction with the accompanying drawings, wherein:

FIG. 2 is a front elevational view of the control box housing with the front cover removed, and with a portion of the pedestal broken away to reveal the pilot valve housing;

FIG. 3 is a front elevational view of the control box and its pedestal mounting, with the cover of the control box in position;

FIG. 4 is a right side elevational view of the control box and pedestal of FIG. 3;

FIG. 5 is an enlarged fragmentary, vertical sectional view through the control box, taken on the line 5—5 of FIG. 4;

FIG. 6 is an enlarged horizontal sectional view through the pilot shaft drive connection, taken on the line 6—6 of FIG. 5;

FIG. 7 is a fragmentary vertical sectional view taken on the line 7—7 of FIG. 5, showing the daily program dial and calendar dial, and the mechanism associated therewith, in side elevation;

FIG. 7A is an enlarged perspective view of a tapered stop comprising an element of the timer switch mechanism;

FIG. 8 is a fragmentary sectional view taken on the line 8—8 of FIG. 7, showing certain elements of the driving mechanism for the daily program and calendar dials;

FIG. 9 is an enlarged fragmentary sectional view taken on the line 9—9 of FIG. 7, showing further details of the dial driving mechanism;

FIG. 10 is a similar fragmentary sectional view taken on the line 10—10 of FIG. 7;

FIG. 11 is an enlarged horizontal sectional view taken on the line 11—11 of FIG. 5, showing the station indicator and selector knob;

FIG. 12 is a fragmentary horizontal sectional view taken on the line 12—12 of FIG. 5, showing one of the wafer switches of the main selector switch;

FIG. 13 is an enlarged fragmentary horizontal sectional view taken on the line 13—13 of FIG. 5, showing the other of the wafer switches of the main selector switch;

FIG. 14 is a vertical sectional view through the station selector knob, taken on the line 14—14 of FIG. 11;

Figure 1:
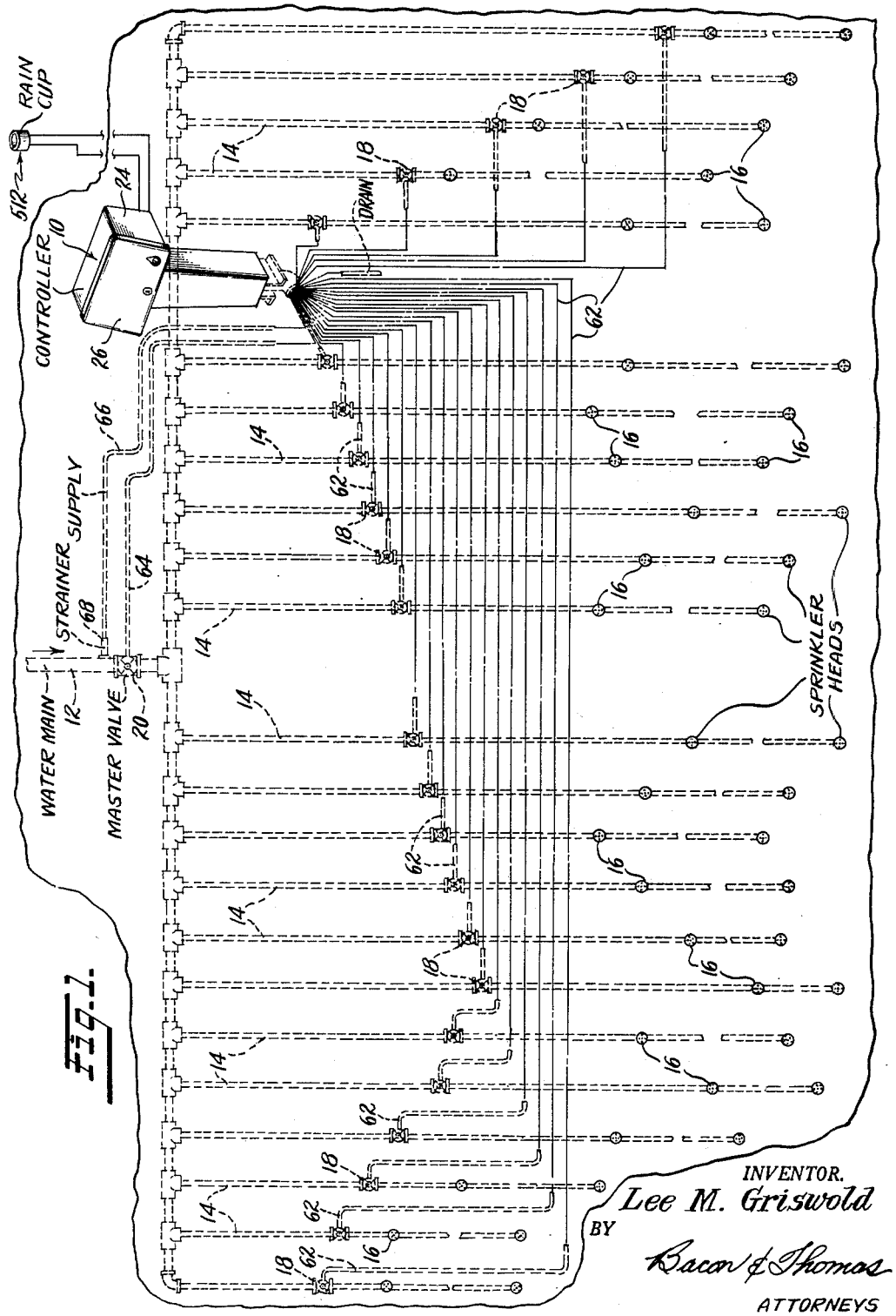
FIG. 1 is a diagrammatic view illustrating a control unit embodying the principles of the present invention applied to a lawn sprinkler control system.

FIG. 15 an enlarged fragmentary vertical sectional view through said one wafer switch, taken on the line 15—15 of FIG. 12;

FIG. 16 is an enlarged fragmentary vertical sectional view through said other of said wafer switches, taken on the line 16—16 of FIG. 13;

FIG. 17 is an exploded front elevational view of the elements of the pilot valve;

FIG. 18 is a horizontal sectional view taken on the line 18—18 of FIG. 17;

FIG. 19 is a horizontal sectional view taken on the line 19—19 of FIG. 17, showing the driver for the pilot disk;

FIG. 20 is an enlarged plan view of the pilot valve disk taken on the line 20—20 of FIG. 17;

FIG. 21 is a vertical sectional view through the pilot disk, taken on the line 21—21 of FIG. 20;

FIG. 22 is a horizontal sectional view of one of the pilot valve gaskets, taken on the line 22—22 of FIG. 17;

FIG. 23 is a horizontal sectional view taken on the line 23—23 of FIG. 17, showing the porting in the fluid distributing plate of the pilot valve;

FIG. 24 is an enlarged vertical sectional view through the fluid distributing plate, taken on the line 24—24 of FIG. 23;

FIG. 25 is a plan view of another pilot valve gasket, taken on the line 25—25 of FIG. 17;

FIG. 26 is an enlarged vertical sectional view taken on the line 26—26 of FIG. 26;

FIG. 27 is a horizontal sectional view taken on the line 27—27 of FIG. 17, showing the porting in the tube plate of the pilot valve;

FIG. 28 is an enlarged fragmentary vertical sectional view through the tube plate, taken on the line 28—28 of FIG. 27;

FIG. 29 is a fragmentary vertical sectional view through the assembled pilot valve;

FIG. 30 is an enlarged fragmentary front elevational view showing the actuating mechanism for the cycle starting switch;

FIG. 31 is a fragmentary front elevational view showing a pin in the time or daily program dial moved slightly to the left or counterclockwise of the position shown in FIG. 30;

FIG. 32 is a view similar to FIG. 30 showing how the time dial pin rides beneath the starting switch actuating mechanism when there is no pin in the calender dial;

FIG. 33 is a fragmentary perspective view, partly in cross-section, showing the starting switch actuating mechanism;

FIG. 34 is an enlarged vertical sectional view through a bore or opening in the time dial, taken on the line 34—34 of FIG. 32;

FIG. 35 is an enlarged fragmentary vertical sectional view through one of the time dial pins taken on the line 35—35 of FIG. 32;

FIG. 36 is a fragmentary sectional view taken on the line 36—36 of FIG. 35;

FIG. 37 is a plan view of the printed circuit board embodied in the present control unit;

FIG. 38 is a wire diagram of the cyclically operable means for effecting sequential opening of the flow control valves;

FIG. 39 is a wiring diagram of the electrical components of the control system;

FIG. 40 is a fragmentary view, partly in perspective, showing the assembly of the pilot valve, interceptor valve, and precipitation sensing device;

FIG. 41 is a view similar to FIG. 40 showing a modification of the assembly shown in FIG. 40, wherein a power failure device has been added;

FIG. 42 is a fragmentary side elevation of the selector knob and main selector switch, but showing a modification in which a third wafer switch is included for use in a system wherein the sprinkling valves are operated electrically instead of hydraulically; and FIG. 43 is a wiring diagram for a system including the third wafer switch shown in FIG. 42.

With reference to the drawings, and more particularly to FIG. 1 illustrating the application of the invention to a water sprinkler system, the control unit is designated in its entirety by the reference numeral 10. A water main or supply pipe 12, together with a header and a plurality of branch conduits 14, supplies water to a number of sprinkler heads 16, there usually being a plurality of sprinkler heads in each branch duct. Each branch conduit 14 includes a flow control valve 18, and the supply pipe 12 includes a master valve 20, all of said valves being under the control of the controller 10, as will appear more fully hereinafter. The system and control means shown provides for twenty-three branch conduits 14.

It will be understood that the branch conduits 14 need not have a sprinkler head connected therein, but may be arranged to discharge into a ditch, as when the present control is associated with a system of irrigation ditches.

Referring to FIGS. 2, 3 and 4, the controller 10 includes a housing 24 having a removable front cover 26. Within the housing there is mounted a panel 28, having a large circular opening 30 for receiving a time or daily program dial 32, a smaller adjacent circular opening 34 for receiving a calendar dial 36, an opening 38 for receiving a station indicator and manual station selector knob 84, and a series of elongated openings 40, arranged in two tiers, for receiving individual station timers 50. The panel 28 also has an opening 42 for a toggle control switch 428.

A timing means 44 (FIG. 7) is attached to the back wall of the panel 28, and includes a clockwork mechanism 46, and a timer switch 48, with suitable driving connections, as will be more fully explained hereinafter. Also mounted on the back wall of the panel is a series of watering station timers 50, a separate timer being provided for each watering station under the control of the controller 10. As is shown in FIG. 2, the timers 50 are mounted so that the outer periphery of a manually operable disk portion thereof extends through an opening 40 in the panel 28, where it can be manually set to provide watering intervals of various durations, as explained in greater detail hereinafter. To one side of each opening 58, there is an indicator 51 carrying appropriate legends to designate the location of the particular sprinkler control valve 18, or watering station, corresponding to the adjacent timer 50.

A bottom wall 52 of the housing 24 supports a cyclically operable means 54, which will be described in detail later. The housing 24 is carried by a hollow vertical pedestal support 56 (FIGS. 3 and 4) adapted to be mounted upon a concrete base 58. A tubular conduit 60, passes through the vertical support 58 and the concrete base, and includes a number of tubes 62 providing operating fluid connections, one to each of the flow control valves 18, and a single tube connection 64 to the master valve 20. A pressure supply conduit 66 for operating fluid is connected with the supply pipe 12 upstream of the master valve 20, and also passes through the base 58 and pedestal 56. The pressure supply conduit 66 includes a strainer 68 at its inlet end for preventing the entry of foreign matter thereinto.

The vertical pedestal 56 also receives an electrical conduit 70 for supplying the power for operating the various electrical members within the controller 10.

With reference to FIGS. 5, 6, 7, and 11 to 16, inclusive, the cyclically operable means 54 comprises an electric driving motor 72, mounted on a support plate 73, which plate is carried by supports 74 connected at their lower ends to the wall 52. The supports 74 comprise spacing members having threaded bores for receiving screws which pass through the support plate 73 and the bottom wall 52, respectively.

The motor 72 is connected with a driving or output shaft 75 by a well known one-way clutch, not illustrated herein but shown in FIG. 7 of the application of David E. Griswold, Serial No. 670,061, filed July 5, 1957. The driving or output shaft 75 is connected with the upper end of a driven shaft 76, as is more clearly shown in FIG. 14. The shaft 75 is O shaped in cross section, while the shaft 76 is non-circular, as is best shown in FIGS. 11, 12 and 13. The upper end of the driven shaft 76 is provided with an axial bore to receive the lower end of the shaft 75, and a non-rotatable connection between the two shafts is formed by a staking operation, producing a deformation of the surrounding shaft 76, as shown at 77 in FIG. 11. The shaft 76 is rotatably mounted in a bearing carried by the support plate 73, while an upper bearing plate 78 includes a bearing for an intermediate portion of the driven shaft 76. The bearing plate 78 is held in position by a support member 80 fastened at its lower end to the bottom wall 52 of the housing, and by spacers on the supports 74.

The lower end of the driven shaft 76 rotates within a bearing carried by a bearing plate 82. Between the bearing plate 78 and the lower bearing plate 82, there are provided a first wafer switch 86 and a second wafer switch 88, the wafers and the lower bearing plate 82 being supported from the bearing plate 78 and being retained in spaced relation by a pair of combined supports and spacers 90, each comprising hollow spacer sleeves and a bolt 91 passing through the sleeves, the wafers and the bearing plates (FIG. 5). A combined indicator dial and station selector knob 84 also serves as a cam and is non-rotatably carried by the driven shaft 76. The knob 84 is disposed between the top support plate 73 and the bearing plate 78.

Referring to FIG. 11, a set screw 92 extends radially through the knob 84 to engage a flat wall of the shaft 76 to prevent relative rotation. The periphery of the knob 84 includes twenty-four equally spaced, axially extending, arcuate grooves or notches 94. The surfaces between the notches 94 are serrated, as shown at 96 in FIG. 7 to facilitate manual turning of said knob. The spaces between the notches 94 and above the serrations 96 are designated by numerals 1 through 23, while the space, aligned with the set screw 92, is designated OFF.

As will appear more clearly hereinafter, there is a notch or groove 94 provided for each of the twenty-three stations in the sprinkler system, and one additional groove for the OFF or inactive position of the device. As is shown in FIG. 2, a portion of the periphery of the selector dial knob 84 protrudes through the opening 38 in the panel 28, in a position where it can be manually operated, if desired, to change the setting thereof at any time. An arrow-head 98 disposed above the opening 38 and pointing toward one of the numbers on the periphery of the dial 84, provides a visual indication of the particular station that is receiving water. If the word OFF on the knob 84 happens to be opposite the arrow-head 98, this indicates that the sprinkler system is shut down, i.e., no watering station is in action.

Referring to FIGS. 12 and 15, the first wafer switch 86 includes a pair of spaced terminals 100 and 102 secured to the wafer 86. Secured to the driven shaft 76, to be rotatable therewith, is an annular conductor ring 104, having a cutout portion 106 in its periphery. The terminal 100 is longer than the terminal 102, whereby it contacts an unbroken surface on the annular conductor ring 104 at all times. The terminal 102, being shorter, contacts a surface of the annular conductor ring adjacent the outer periphery, so that there is no contact with the conductor ring when the cut-out portion 106 moves into radial alignment with the terminal 102.

The second wafer switch 88, shown in FIGS. 13 and 16, carries twenty-three contact elements 108 and one contact element 109. Twelve of these contact elements are mounted upon the upper surface of the wafer 88 and the other twelve are mounted upon the lower surface, the contact elements being arranged in circumferentially staggered relation, as is more clearly shown in FIG. 13. A pair of contacts 110 are non-rotatably secured to the shaft 76, one contact lying above the wafer 88 and the other below the wafer, as shown in FIG. 16. The contact element 109 constitutes an input terminal, and is longer than the contact elements 108, as is more clearly shown in FIG. 13, whereby to engage, in wiping contact, the ring portion of one of the contacts 110, the upper and lower contact being electrically interconnected by a metal rivet 111, as shown in FIG. 16. Each contact 110 includes a tongue 112, which is adapted to pass between and engage spaced surfaces on each of the contact elements 108, as is shown in FIG. 16, for a purpose to be set forth hereinafter. The tongues 112 are disposed in alignment so that only one tongue at a time engages one of the contact elements 108.

Referring to FIG. 11, a microswitch 114 is mounted on the bearing plate 78 adjacent the selector dial or knob 84. A roller or follower 116 is carried by an arm 117 pivoted on the microswitch 114 and is cooperable with the notches 94, to operate a movable switch member 118 to open and close microswitch contact elements, as will appear more fully hereinafter.

The lower end of the shaft 76 is circular in cross section, and projects through an opening in the bottom wall 52 of the housing 24, as shown in FIG. 5. The lower bearing plate 82 includes a downwardly projecting prong 121 (FIGS. 12 and 42), adapted to be received within an opening in the bottom wall 52 to prevent relative rotation. The lower bearing plate 82 also includes a threaded extension 120, which projects through an opening in the bottom wall 52, and is secured by a nut 123. A pin 124 passes through a transverse opening in the end 122 of the shaft 76 for the purpose of operating the pilot disk 202, as is explained more fully below.

Referring to FIGS. 2, 17, 40 and 41, a pilot valve 126 is mounted below the bottom wall 52 of the housing 24 on a bracket 128 secured to the bottom wall by spacers and screws 129. The pilot valve 126 includes a cover 130 having a neck 132 with an axial extension 134, which is peened about the periphery of an aperture 136 in the mounting bracket 128 (FIG. 17). The neck 132 has an axial bore 138 and a counterbore 139, the lower part of the cover being enlarged to provide a pressure chamber 140. The lower end of the axial bore 138 is counterbored at 142 to receive a sealing ring 228, as will be pointed out more fully hereinafter.

The pilot valve 126 also includes a tube plate 144, a gasket 146, and a fluid distribution plate 148; these parts being held in assembled relation by: six equally spaced screws 150 having countersunk heads, and shanks which pass through the tube plate 144, gasket 146, distribution plate 148 and into threaded openings in the cover 130; six equally spaced screws 152, which pass through aligned openings in the tube plate 144, gasket 146 and into threaded bores in the distribution plate 148; and a pair of diametrically disposed screws 154, having fillister heads, which pass through the distributor plate 148, and a gasket 160 to be received within threaded bores in the cover 130.

The upper surface of the distribution plate 148 is provided with an elevated central portion having an annular channel 156 to form an outer ring 157 and a raised valve seat 158. A portion of the annular channel 156 is occupied by the gasket 160.

Referring to FIGS. 27, 28 and 29, the tube plate 144 includes a central axial drain aperture or port 162, the lower end of which is counterbored at 164 to receive a drain tube 166. An inner circle of uniformly spaced axial apertures 168 surrounds the central aperture 162, and an outer circle of uniformly spaced apertures or ports 170 surrounds the inner circle, the apertures in the inner and outer circles being staggered and disposed 15° apart. The outer ends of the apertures 168 and 170 are counterbored at 172, to receive the ends of the tube connections 62 leading to the flow control valves 18 and the end of the tube conection 64 leading to the master valve 20. The tube plate 144 also includes an axial supply aperture 174, which receives the discharge end of the supply conduit 66. The bottom surface of the tube plate 144 is recessed in an area surrounding the tubes 62, 64, and 66, which recess is filled with solder 178 to permanently secure the ends of tubes in the counterbores in plate 144.

Referring to FIGS. 25, 26 and 29, the intermediate plate includes the central aperture 180, an inner circle of twelve uniformly spaced apertures 182, and an outer circle of uniformly spaced radially extending slots 184, the slots and apertures being staggered as shown in FIG. 25. The intermediate plate 46 also includes a circle of apertures through which the screws 150 extend, and an outer circle of apertures for receiving the screws 152. An aperture 186 extends through the intermediate plate 146, and is adapted to be aligned with the supply aperture 174 in the tube plate 144.

The distributor plate 148 (FIGS. 23, 24 and 29) includes twelve axially extending apertures or ports 188, and twelve apertures or ports 190, the apertures 188 and 190 being arranged alternately within a circle in the valve seat 158. The valve seat 158 also includes a central aperture 192, and the bottom wall of the annular channel 156 includes an axial supply aperture 194 which, as shown in FIG. 29, is axially aligned with the supply aperture 186 and supply aperture 174. As will be observed from FIGS. 23 and 24, the lower or discharge ends of the apertures 190 are directed diagonally outwardly. By virtue of this arrangement, the outlet ends of the apertures 190 will lie on a circle concentrically disposed about the circle formed by the outlet ends of the apertures 188. Thus, the outlet ends of the apertures 188 will align with the inner circle of apertures 182 in the intermediate member 146, and the outlet ends of the apertures 190 will register with the iner ends of the radial slots 184, as more clearly shown in FIG. 29. As will be seen in the latter figure the outer ends of the slots register with the outer circle of the apertures 170 in the tube plate 144.

The periphery of the distribution plate 148, outside the outer circle 157, includes six uniformly spaced threaded apertures 196, to receive the threaded ends of the screws 152.

The gasket 160 (FIG. 22) is provided with a cut-away section 198, to expose the upper end of the axial supply aperture 194, whereby to permit the flow of pressure fluid from the supply conduit 66 into the pressure chamber 140.

A pilot valve 200 is disposed for rotation on the valve seat 158. The valve 200 comprises a rotary disk 202 (FIGS. 20 and 21), having an upper central recess for a purpose to be set forth hereinafter, and an inner circle of ports 206 to receive lubricant material. A peripheral circle of twenty-three axial ports 208 passes through the disk. The lower surface of the disk 202 includes a central bore 210, the inner end of which joins a radial bore 212. An axial bore 214 connects the lower surface of the disk with an intermediate end of the radial bore 212. The outer periphery of the disk is cut away to provide a shoulder 216, which receives the lower end of a tight fitting sleeve 218, soldered as shown at 219 to said disk. The seleve 218 prevents the escape of fluid from the outer end of the radial bore 212.

The upper end of the sleeve 218 includes three equally spaced slots 220. A spring 222 (FIGS. 17 and 29) is received within the recess 204, the spring contacting the lower end of a disk operating shaft 224 having, on the lower end thereof a driver with three radial fingers 226 received within the slots 220. The shaft 224 is rotatably mounted in the axial bore 138 in the cover member 130, and the O-ring 228, received within the counterbore 142, prevents loss of fluid along the shaft. A washer 230 surrounds the shaft 224 and engages the O-ring 228 to retain it in position. A connector 232 (FIGS. 17 and 18) provides a connection between the lower end 122 of the shaft 76 and the upper end of the disk operating shaft 224. The connector 232 includes a transverse threaded bore 234 to receive a threaded pin 235 which passes through a transverse aperture 236 in the upper end of the shaft 224, to couple the connector with the shaft. The connector also includes an axial aperture for receiving the upper end of the disk operating shaft 224 and the lower end 122 of the driven shaft 76, the upper end of the aperture having a transverse slot 240 to receive the pin 124 in the lower end 122 of the shaft 76, thereby establishing a driving connection through the connector 232 from the driving motor 72 to the rotary disk 202. A collar 242 surrounds the upper portion of the connector 232 to prevent axial movement of the pin 124 in an obvious manner.

A mounting bracket 244 (FIG. 40), connected with the mounting bracket 128, supports an interceptor valve 246 in close proximity with the pilot valve 126. The interceptor valve is of a well known three-way type, and includes a first fitting 248, a second fitting 250 and a third fitting 251. A solenoid 252 is adapted, when energized and deenergized, to actuate the interceptor valve in a well-known manner. The fitting 248 is connected with the pressure chamber 140 of the pilot valve by a connection 254; the fitting 250 is connected with the drain tube 166; and the fitting 251 is connected with an outlet 256 leading to a point of waste or disposal.

The timing means 44 (FIGS. 7 to 10) comprises a pair of spaced support plates 258 and 260, retained in assembled and spaced relation by a plurality of spacer sleeves and screws 262. The front support plate 258 carries a series of forwardly projecting supporting sleeves 264 by which the entire timing means may be supported from the back wall of the panel 28 with the daily program dial 32 and the calendar dial 36 registering with the openings 30 and 34, respectively.

A clock motor 266 is secured to the support plate 260 by a series of spaced screws 268, the screws engaging and supporting a bearing plate 273 on the rear side of the support plate 260. The clock motor 266 includes reduction gearing 270, and a shaft 271 which extends through an opening in the support plate 260 and bearing plate 273, having a pinion 272 on the end thereof. A second bearing plate 274 is disposed in spaced relation and parallel with the bearing plate 273, said bearing plates being maintained in this relation by a series of spacer sleeves and screws 276.

The pinion 272 engages a gear 278 on a shaft 280, having bearings in the bearing plates 273 and 274. The gear 278 engages a gear 282 mounted for rotation with a shaft 284 having bearings in the spaced support plates 258 and 260, the bearing in the support plate 258 being in the form of an arcuate slot 286, as more clearly illustrated in FIG. 5. A spring 288 is supported on the plate 258 by a pair of screws 290, and engages an end of the shaft 284 projecting in front of the support plate 258 and urges the shaft in an upward direction to cause a pinion 292 thereon to engage a gear 294 mounted on a shaft 296 having bearings in the plates 258 and 260. One end of the shaft 296 projects forwardly of the plate 258 and carries a pinion 298 engaging a gear 300 connected with the daily program dial 32.

The shaft 280 is connected with a sun gear 304 of a planetary gear system including planet gears 306 on a planet carrier, and a surrounding ring gear 308. The carrier of the planet gears 306 is connected with a collar 310 rotatably mounted on the shaft 280, including a pinion 312 in driving relation with a gear 314 on a shaft 316.

The internal teeth on the ring gear 308 engage the planet gears 306, and external teeth 318 on the ring gear engage a pinion 320 on a hollow shaft 322 rotatably supported on a shaft 323 carried by the bearing plate 273.

The hollow shaft 322 also carries a ratchet wheel 324, cooperating with a pawl 326 pivoted at 328 on a mounting bracket 334, there being a spring 330 provided to maintain the pawl 326 spaced from the ratchet wheel 324. The bracket 334 also supports a solenoid 332, which, when energized, moves the pawl 326 into contact with the ratchet wheel 324 to lock or prevent rotation of the ratchet wheel and the ring gear 308 connected therewith.

A switch wafer 336, FIGS. 7 and 8, is supported in spaced relation from the bearing plate 274 by a series of spacers and screws 338, and includes a cooperating lower rotor 340 and an upper rotor 342 connected and rotatable with the shaft 316. Each rotor includes a tongue 344 adapted to engage a series of contacts arranged in a circle and connected with the upper and lower surfaces of the wafer, each contact including a contacting surface disposed in the path of rotation of one of the tongues to be contacted thereby. The wafer 336 also carries a contact 348 which engages a circumferential portion of one of the rotors to supply current thereto. The upper and lower rotors 340 and 342 are electrically interconnected, and the tongues 344 are disposed one directly above the other. Twenty-four contacts 346 are provided, one half being connected to the upper surface of the wafer and the other half being connected to the lower surface of the wafer, the contacts being disposed in staggered relation, as clearly shown in FIG. 8. The extremity of the shaft 316 carries a collar 350 to which is attached a screw threaded radially disposed stem 352. The wafer 336 carries a stop 354, disposed in the path of the stem 352. A coil spring 355, FIG. 9, is connected at one end with the collar 310, and tends to rotate the shaft 316 in a counterclockwise direction, to bring the stem 352 against the stop 354. As shown in FIG. 7A, the stop is provided with a cam surface, and is mounted on a screw 356 (FIG. 7), whereby rotation of the stop effects axial adjustment along the screw and brings different portions of the cam surface in the path of the stem 352, thus varying the distance from the starting position to the first contact engaged by the tongues 344.

The daily program dial 32 (FIG. 2) carries a knob 357 in the form of an oblong parallelogram, which is screwed to the dial 32 to facilitate manual rotation in a counterclockwise direction. Movement of the dial 32 relative to the clock motor is facilitated by the slot bearing 286, which permits the shaft 284 to move against the force of the spring 288 and allow the pinion 292 to ratchet relative to the gear 294. The front face of the dial 32 carries a series of uniformly spaced indicia to indicate the twenty-four hours of the day, and is designed to complete one complete revolution every twenty-four hours. Such indicia consists of two sets of numerals 1 to 12, one set for "day" and the other for "night." Adjacent each numeral and between adjacent numerals are a series of transverse or axially extending pin-receiving openings 358 to selectively receive program setting pins 360. Each opening 358 (FIGS. 34, 35 and 36) is provided with an enlargement 362 intermediate and spaced from the ends thereof. The pins 360 are made of "Nylon" or other yieldable material and comprise a head 364 and a shank 366, the shank being of a diameter to be received within the outer ends of an opening 358, and having an enlarged portion 368 to be received within the enlargement 362 of the aperture. To facilitate insertion of the pin, a portion of the shank in the area of the enlargement 368 has an axially extending recess 370, slightly longer than the axial length of the enlargement 368, the recess having an arcuate bottom wall, and having side walls which taper from a maximum at the midpoint to a minimum at each end. It is evident that, with such structure, the side walls of the recess are yieldable and can be forced together to permit contracting the diameter of the enlargement 368 when the pin is forced into one of the openings 358 and that the pin is permitted to expand when the enlarged portion 368 registers with the enlargement 362 in the opening, to positively retain the pin in position in the aperture.

The panel 28, FIG. 2, between the openings 30 and 34, is provided with a pair of arrows 372, one pointing upwardly to the calendar dial 36, and the other pointing downwardly to the daily program dial 32.

The periphery of the calendar dial 36 has a series of axially extending openings 374, which are identical in construction with the openings 358 in the daily program dial 32, there being one aperture located in registry with each daily indicia for a two-week period. The calendar dial 36 is on a shaft 376, FIGS. 7 and 8, supported by bearings in the support plates 258 and 260. The calendar dial has fourteen, generally triangular, peripheral notches 378 corresponding in position with the indicia of the days of the week appearing thereon. The daily program dial 32 carries a radial operating member 380, FIG. 32, which is adapted to engage one of the notches 378 for each complete revolution of the daily program dial to rotate and index the calendar dial one-fourteenth of a revolution, corresponding to one day of the week. The calendar dial 36 also includes a detent device comprising a series of axially extending teeth 382 on an extension thereof adapted to engage corresponding teeth 384 on a detent 386 (FIGS. 7 and 8). The detent 386 is axially slidably mounted on the shaft 376, and a spring 388, between the detent 386 and the support plate 258, resiliently urges the teeth surfaces together. The detent includes a radial arm 390, having an aperture to receive a guide 392, permitting axial movement of the detent but preventing rotation thereof. The detent teeth 382 and 384 (FIG. 7) are arranged with axially and angularly extending surfaces forming a one-way clutch, permitting rotation of the calendar dial 36 in one direction but not in the other.

A microswitch 394 (FIGS. 30, 31 and 32), is secured to the plate 258, adjacent the dials 32 and 36, by a pair of screws 396. The microswitch includes a movable switch member 398 which is resiliently urged to its outermost position. An operating member 400 is resiliently mounted by a spring support 402 on the plate 258, the support 402 including a bracket engaged by the screws 290. The operating member is an elongated structure generally of U-form in cross section, having a pair of spaced upright walls 404 and 406. The upright wall 404 carries a first cam surface 408, bent at right angles therefrom and disposed in the path of movement of a pin carried by the calendar dial 36, as will be pointed out more fully hereinafter. The upright wall 406 provides an arm having a second cam surface 410, disposed in the path of movement of a pin 360 carried by the daily program dial 32. The microswitch 394 supports a cam arm 412 pivotally mounted at 414, and having a cam surface 416 moved into the path of movement of a pin 360 carried by the daily program dial 32 when the cam surface 406 is actuated by a pin on the calendar dial 36.

As seen in FIG. 31, the cam surfaces 410 and 416 are so disposed that a pin 360, in passing between them, will urge the cam surface 416 upwardly and the cam surface 410 downwardly. The arm carrying the cam surface 410 is slightly longer than the arm carrying the cam surface 416 for a purpose to be explained more fully hereinafter. The cam arm 412 carries, intermediate the ends thereof, an operating arm 418, the free end of which engages the movable switch member 398. The arm 412 also carries an adjusting screw 420 engaging the operating arm 418 intermediate its ends, for adjusting the distance between the arms 418 and 412. A lock nut 422 retains the adjusting screw 420 in adjusted position. In the nonoperating position, shown in FIG. 32, the resilient support 402 urges the operating member 400 to its uppermost position, which raises the arm carrying the second cam surface 410 clear of a pin 360 in one of the apertures 358 of the daily program dial 32. The cam surface 410 on the cam arm 406 engages the cam 416, thereby urging the cam arm 412 to rotate in a clockwise direction against the force of the microswitch spring and forcing the movable switch member 398 to its uppermost position shown in FIG. 32.

In operation, a pin 360 is placed in one or more of the apertures 374 in the calendar dial 36 on the day or days that operation of the sprinklers is desired, and one or more pins 360 are placed in the apertures 358, at the desired hour or half hour, night or day, that sprinkling is desired. The clock mechanism rotates the dial 32 in a counterclockwise direction, and every twenty-four hours, at midnight, the operating member 380 engages a notch 378 in the calendar dial to advance it one step. So long as there is no pin in the calendar dial 36 corresponding to the day of the week registering with the arrows 372, the operating member 400 will remain in its uppermost position (FIG. 32), and the pins 360 in the daily program dial 32 will ride clear of the cams, as more clearly illustrated in the perspective view of FIG. 33. However, should there be a pin 360 in one of the days in the calendar dial 36 registering with the arrows 372, the pin 360 will engage the cam surface 408 when the calendar dial 36 is stepped into position, and will move the operating member 400 to the position shown in FIGS. 30 and 31. This movement brings the cam surfaces 410 and 416 directly into the path of movement of one or more pins 360 mounted in the apertures 358 of the daily program dial 32. It should be noted that these apertures are arranged at one-half hour intervals. As the pin 360 rotates, it moves between the cam surfaces 410 and 416, as shown in FIG. 30, depressing the cam surface 410 and the operating member 400, and raising the cam surface 416, producing an upward movement of the movable switch member 398. It should be explained, at this point, that the movement of the operating member 400, when engaged by a pin 360 in the daily program dial 32, is not sufficient to cause actuation of the movable switch member 398 to make electrical contact. In the position shown in FIG. 30, the cam surfaces 410 and 416 are separated, which causes the movable switch member 398 to move toward its inoperative position. As shown in FIG. 31, further counterclockwise movement of the program dial 32 permits the cam surface 416 to ride off the surface of the pin 360, while the cam surface 410 is still engaged by the pin, because of the longer length of the arm 406 as described above. When the cam surface 406 rides off the pin 360, the cam arm 412 is permitted to rotate counterclockwise sufficiently to actuate the movable switch 398 to make electrical contact to initiate the start of a cycle, as explained more fully hereinafter. Slight further movement of the program dial 32 in the counterclockwise direction permits the cam surface 410 to ride off the pin 360, whereby the resilient support 402, being stronger than the force acting on the movable switch member 398, forces the operating arm 400 upward to move the switch member 398 to its inoperative position to break the starting circuit.

The electrical circuit is shown in FIG. 39, wherein the leads are designated as L-1 and L-2. From the lead L-1, there is shown a fuse 424, a conductor 426 to the toggle switch 428, and a conductor 430 from the conductor 426 to the clock motor 266, and conductors 432 and 434 to the lead L-2. According to this hook-up, it is evident that the clock motor 266 is always in operation, to maintain the daily program dial 32 and the calendar dial 36 in operation. By grasping the knob 357 on the daily program dial and turning the dial in a counterclockwise direction, the slotted bearing connection 286 for the end of the shaft 284 will permit ratcheting of the pinions 292 and 294 to disconnect the drive between these members and permit rotation of the dial relative to its driving connection. The detents 386, 382 and 384 in the calendar dial permit manual setting thereof.

Closing of the toggle switch 428, which sets the device on automatic operation, provides a circuit from the lead L-1, conductor 426, switch 428, conductors 436, 437 and 438 to the input terminal 109 of the wafer switch 88, and through the contactor 110 and tongue 112 (point 12) through the conductors 440 and 441 to the common terminal 442 of the microswitch 394. Assuming that this microswitch 396 has been made operative by the mechanism described above, the movable member 398 of the switch is moved into contact with the terminal 444, causing a flow of current through the conductors 446, 448, 450, pilot motor 72, conductors 452 and 434, and lead L-2, to energize the pilot or driving motor 72, which causes rotation of the drive shaft of the wafer switches 86, 88 and the station selector knob 84, as indicated by the mechanical connections shown in broken lines. Initial movement of the pilot motor 72 rotates the selector knob 84 and causes the cam roller 116 to be moved out of its cam groove 94 to move the movable switch member of the microswitch 114 to contact the terminal 458, whereupon electrical current will flow from conductor 437 through conductor 454, terminal 456, movable member of the microswitch 114, terminal 458, conductor 450, pilot motor 72 and conductors 452 and 434, to maintain the pilot motor in operation, even after the movable member 398 of the microswitch 394 is rendered inoperative by movement of the pin 360 in the daily program dial 32 to an inoperative position. As the shaft 104 of wafer switch 86 continues rotation in a clockwise direction, the conducting surface thereof will engage the terminal 102, permitting flow of current from conductors 426, 460, pump relay 462, conductors 464, 466, 468, conductor ring 104, conductors 470, 452 and 434, thus completing the circuit through the pump relay to start a pump (not shown) in operation, should the system require the use of a pump for its operation. As the movable member of the microswitch 114 does not engage the terminal 472, the clutch 326 is inactive.

The pilot motor 72 continues operation for a part of a revolution until the cam follower 116 drops into the next cam groove 94 in the selector member 84, thereby breaking the circuit to the pilot motor 72, and bringing the pilot motor to a positive halt, without any overrunning. The tongue 112 in wafer switch 88 has now moved clockwise to the terminal indicated 13, which establishes a circuit through the conductor 478 to the timer control 50 for Station No. 1 which, as shown, is set in its OFF position. In this position, there is a circuit established from Station No. 1 timer control 50, conductors 480, 482 and 484 to the terminal designated 22 of the timer switch 336. This terminal 22 corresponds to the zero time position of the timer switch, and a circuit is established through the rotors 340 and 342 and tongue 344, contact 348, conductors 499, 446, 448, 450, pilot motor 72 and conductors 452 and 434 to the lead L-2 to again energize the motor 72, which operation is effective to skip watering at Station No. 1, which was set to the OFF or no watering position.

As the pilot motor 72 continues operation, the cam follower 116 rides out of the cam groove 94 and again moves the movable member of the microswitch into contact with the terminal 458, again establishing the circuit through the motor 72, as previously described, which continues until the cam follower 116 drops into the next cam groove 94 in the station selector knob 84 to break the circuit and to bring the movable member of the microswitch 114 into contact with the terminal 472. The pilot motor 72 is again instantly stopped with the tongue 112 of the contactor 110 in register with the point 14 of wafer switch 88, which establishes a circuit through the conductor 486 to the station timer 50 at Station No. 2. As shown, this timer 50 is set for a 3-minute watering interval (but could be set for an interval of 1 hour, if desired), which establishes a circuit through the conductors 488, 490 and 492 to the terminal designated 20 in the timer switch 336. The bridging of the terminals 456 and 472 of the microswitch 114 establishes a current through the conductors 454, 474, clutch 326, conductors 476, 466, 468, annular conducting ring 104 of wafer switch 86, and conductors 470, 452 and 434, which energizes the solenoid 332 to bring the pawl 326 into engagement with the ratchet wheel 324, thus preventing rotation of the ring gear 308, whereby the clock motor 266 is effective to drive, through the planetary gearing, the shaft 316 and the rotors 340 and 342, causing rotation thereof in a clockwise direction, as seen in FIGS. 8 and 39. The terminals of the timer switch are so located that one of the tongues 344 engages the point 20 in three minutes, which establishes a circuit through the rotors 340, 342, contact 348, conductors 499, 446, 448, 450, pilot motor 72 and conductors 452 and 434 to again energize the motor, which breaks the circuit in the microswitch 114 to deenergize the clutch 326, and to establish a circuit, under the control of the station selector knob 84, which continues operation of the pilot motor until the cam follower 116 again drops into the next cam groove 94.

The deenergization of the clutch 326 deenergizes the clutch solenoid 332 to permit the spring 330 to withdraw the pawl 326 from the ratchet wheel 324, whereby the coil spring 355, which was wound during the operation of the timer switch, is effective to return the shaft 316 to its starting position, wherein the stem 352 is brought against the stop 354. Operation in the above manner is repeated, and at each stop of the pilot motor 72, the tongue 112 of the contact 110 of the wafer switch 88 is successfully brought into engagement with the contact points numbered 13 through 24 and 1 through 12, placing into operation each of the sprinkling stations to effect a watering cycle.

Each station control includes a separate timer 50, which can be set for no watering or for intervals of 1, 3, 5, 10, 15, 20, 30, 40 or 60 minutes. As is shown in FIG. 39, each timer includes two sets of indicia, and the diametrically opposite contacts are interconnected so that either set may be used, but it should be understood that more or fewer time intervals can be used, and by removing the interconnections in the station timers 50 and by adding suitable connections to the timer switch 336, it is possible to double the number of time intervals available to be selected in an obvious manner.

It is to be noted that the point indicated at 60 minutes on the station timers 50 includes no wiring connection. If it is desired to operate a station for 60 minutes, the timer is set at this interval, and the timer switch will be set into motion. After traveling for one hour, the rotors 340 and 342 and the tongue 344 will reach the point indicated by 23, at which time there will be a circuit established through the conductors 436, 498, through the timer switch, contact 348, and conductors 499, 446, 448, 450, pilot motor 72 and conductors 452 and 434 to again start the pilot motor 72 for movement to the next station. After all of the stations have been consecutively energized, the tongue 112 is returned to the point 12, and the open microswitch 396 terminates the cycle.

During the stepping operation of the pilot motor 72, as described above, the pilot disk 202 is also periodically rotated. Assuming that, in the starting position, the passages 210, 212 and 214 of the rotor disk join the connection 64 of the master valve 20 with the drain, the exhaust of fluid from the normally closed master valve permits the valve to close, while the application of fluid pressure through the ports 208 to the connections 62 closes all twenty-three of the normally open flow control valves 18. The valves 20 and 18 are of a fluid pressure type, well known in the art, and a description thereof is unnecessary. Such valves are fluid pressure actuated, and are designed to be opened and closed by the application or exhaust of fluid pressure from pressure chambers therein.

As the pilot disk 202 is rotated, the exhaust ports 210, 212 and 214 are moved into register with the flow control valve 18 of watering Station No. 1, to exhaust the fluid pressure from its chamber to allow opening of the valve, permitting flow of water to the sprinkling heads of Station No. 1, while fluid pressure, through the twenty-three openings 208, apply fluid pressure to maintain the other twenty-two flow control valves 18 is closed and to apply fluid pressure to the master valve 20 to open the latter valve.

It should be pointed out, at this time, that the valves 18 are of the normally open type, requiring the application of fluid pressure to close them, and that the master valve 20 is of the normally closed type, requiring the application of fluid pressure to open it. It is evident, from the above description, that the step-by-step rotation of the pilot valve sequentially opens the twenty-three flow control valves 18, the duration of opening being governed by the timing mechanism described above. After one complete revolution of the pilot disk 202, the parts return to their initial position wherein the master valve 20 is closed and all of the flow control valves 18 are closed, and the system comes to a halt until again activated.

It will be understood that the valves 18 may be of the normally closed type and the master valve 20 of the normally open type, if desired, with appropriate changes in the porting of the pilot disk 202 to effect the same control of the system.

FIG. 37 illustrates a printed circuit on a panel 494, showing the conductors in the upper surface in solid lines and the conductors in the lower surface in broken lines. As seen, these conductors connect with two series of terminals 495 arranged in a semi-circle, there being nine terminals in each group, which are interconnected. It is evident that more or fewer than nine terminals may be provided, and that these may be arranged in a complete circle, if desired, in the form shown in FIG. 39. The panel 494 forms a support for the timer switches 50, which are arranged in two tiers, one below each set of terminals 495, in a manner appearing in FIG. 2, and each of the terminals 495 is connected with a corresponding one of the terminals 346 in the timer wafer switch 336. The terminals 495 and their conductors are connected to a coupler, the sockets of which are shown at 496, there being eleven sockets, nine for the reception of the conductors from the station timers 50, and two sockets to receive the conductors 498 and 499. The panel also includes twenty-three adjacent sockets 500, each of which is connected with a separate station timer 50 in the panel.

Referring to FIG. 38, the cyclically operable means 54 may be assembled as a separate unit, and the twenty-three conductors from the wafer switch 88 are provided with a bank of plugs 502 which, in assembling the device, is adapted to be connected with the sockets 500. As shown in FIG. 38, the bank also includes plugs 504 on the ends of the conductors 468, 440, 437, 448, 474 and 452, which may be assembled in appropriate sockets, not shown, in a conventional manner.

As shown in FIGS. 2 and 5, a heating element 506 is disposed within the vertical support 56 in heat exchange relation with the connecting tubes 62, 64 and 66, and is electrically connected, by a conductor 508, with a temperature sensing element 510, sensing the ambient temperature, and located within the housing 24. The temperature sensing element 510 is arranged to close an electrical circuit to the heating element 506, when the ambient temperature drops below the freezing point to prevent freezing of water in the connecting tubes.

The invention also provides for skipping watering in the event of precipitation in excess of a predetermined amount. Referring to FIG. 40, a precipitation sensor 512 includes a cup 514 housing a quantity of salt-containing earth or sand 516. A series of apertures 518 in the wall of the cup permits the overflow of excess liquid. A conductor 520, from a source of current, is connected with a first electrode 521 extending through the bottom wall of the cup 514 and embedded in the sand 516. A branch conductor 522 is connected with a movable switch element 524 of a relay 525, and a conductor 526 from the relay is connected with the solenoid 252 of the interceptor valve 246. A second electrode 528, spaced from the first electrode 521, extends through the bottom wall of the cup 514 and is embedded in the sand 516. The electrode 528 is connected with a conductor 530, relay coil 532 and conductor 534 to a negative terminal or ground.

In this form of the invention, the solenoid 252 of the interceptor valve 256 is normally deenergized, and the liquid from the drain conduit 166 passes through the fittings 250 and 251 to the drain duct 256. In the event of a predetermined amount of precipitation, the moisture accumulating in the sand, which contains a certain quantity of salt, forms an electrolyte, permitting a current flow through the conductor 520, electrode 521, the electrolyte, electrode 528, conductor 530, coil 532 and conductor 534, which energizes the coil and closes the movable switch element 524, to establish a circuit through the conductors 520 and 522, switch element 524, conductor 526 and solenoid 252, to energize the latter, which moves the three-way interceptor valve 246 to close the connection through the fitting 251 and conduit 256, and to establish a flow connection from the pressure chamber within the cover 130 through the fitting 542, conduit 254, fittings 248 and 250, drain 166, flow passages 210, 212 and 214 in the pilot disc 202 to the pressure chamber of the particular flow control valve 18 that is open at this time, to cause closing thereof. The solenoid 252 remains energized so long as there is sufficient moisture in the sand 516 to form an electrolyte. It is evident, therefore, that the device will skip watering, even though the entire mechanism continues operation and the pilot valve continues its stepping cycle, which would normally sequentially open the flow control valves 18.

FIG. 41 discloses a modification in which the device skips watering, not only in the event of precipitation in excess of a predetermined amount, but also in the event of power failure. Corresponding parts in FIG. 41 and FIG. 40 bear the same reference numerals. In this arrangement, the movable switch element 524 is normally in a switch closing position, as shown, causing a circuit to be established through the conductors 520, 522, movable switch element 524, conductor 526 and solenoid 554 of the interceptor valve 536, which energizes the solenoid, and establishes a connection through the interceptor valve 536 for flow of liquid through the drain tube 166, fittings 548 and 544 to the waste duct 546, and closes flow through the supply conduit 540 and pressure fittings 538.

In the event of precipitation in excess of a predetermined amount, a current flow is established through the conductor 520, electrode 521, the electrolyte in the sand 516, electrode 528, conductor 530, coil 532, and conductor 534 to ground, which breaks the circuit through the movable switch element 524 to deenergize the solenoid 554 of the interceptor valve 536 to establish a liquid flow circuit from the pressure chamber in the pilot valve cover 130, through the fitting 542, supply conduit 540, pressure fitting 538, fitting 548, drain tube 166, and through the passages 210, 212, 214 in the pilot disk 202 to effect closing of the particular flow control valve 18 that is open at this time. In case of power failure, the solenoid 554 of the interceptor valve 536 will become deenergized to effect the same closure operation. The drain tube 166, in this modification, includes a by-pass 550 under the control of a three-way valve 552, which can be manually adjusted to cut out the operation of the interceptor valve 536 if desired.

FIGS. 42 and 43 illustrate an embodiment of the invention employing solenoid actuated flow control valves in place of the fluid pressure operated valves in the preceding embodiment. This form of invention employs similar parts, which are designated by corresponding reference characters.

With reference to FIG. 42, however, there is provided a third wafer switch 556, having a pair of rotors 558 connected with, and rotatable by the shaft 76. One rotor is disposed above and the other below the wafer. Each rotor carries a tongue 560 having twenty-four contacts 561, twenty-three of which are connected with a jack 562 by conductors 563. As shown, these contacts, numbered 7–24 and 1–5, inclusive, are disposed in a circle, alternate contacts being arranged above and below the wafer to be contacted by the tongues 560 thereon. The rotors 558 are electrically interconnected, and are supplied with current by a wiper 570, to which current is supplied by a conductor 568 from a transformer 566. Another conductor 572 provides a ground for the circuits in the jack. In the position of the tongue 560 shown in FIG. 43, no contact is being made, which represents the stop or initial position of the device. The jack 562 includes twenty-three plugs or outlets, each one of which is connected with a separate solenoid operator, not shown, controlling the flow through each flow control valve 18. In operation, the driving motor 72 steps the tongues 560 in sequence to contact the terminals 7–24 and 1–5, inclusive, to open the flow control valves in series, the duration of opening of each valve being controlled, as in the previously described modification, by the time control 50.

It will be understood that although a pilot valve and distribution switch and distribution system have been disclosed wherein twenty-three distribution valves are utilized, the pilot valve and the distribution switch can be modified by providing more or fewer ports or contacts.

It will be further understood that various changes may be made in the details of construction in the circuits, and in the arrangement of the components comprising the present control systems without departing from the principles of the invention or the scope of the annexed claims.

I claim:

1. A control system for a water distribution system having a water supply pipe, and a plurality of branch conduits connected therewith, and a flow control valve in each branch conduit, comprising: cyclically operable means to open and close said flow control valves in a predetermined sequence; and a timing means, including a motor-operated timing switch, and a separate time selector control device associated with each valve and connected to said switch to selectively set the duration of the period that its associated valve remains open, said timing means being structurally independent of and operably connected with said cyclically operable means.

2. A control system as defined in claim 1, in which each time selector control device is operable to omit the cyclical opening of the valve associated therewith independently of said cyclically operable means.

3. A control system for a water distribution system having a water supply pipe and a plurality of branch conduits connected therewith, and a flow control valve in each branch conduit, comprising: cyclically operable means to sequentially open and close said flow control valves, including a driving motor, a station selector dial, a rotary switch, and means to sequentially operate said valves, said station selector dial having notched cam surfaces corresponding in number to the number of flow control valves plus one, and having indicia corresponding to the number of flow control valves plus one which corresponds to an OFF position, said rotary switch having an input terminal and a plurality of output terminals corresponding in number to the number of valves plus one which corresponds to an OFF position, and said valve-operating means having means operable at positions corresponding in number to the number of flow control valves plus one which corresponds to an OFF position, and a driving connection from said driving motor to said station selector dial, rotary switch and said valve operating means; timing means including a separate time selector control device for each flow control valve, a clock motor and a timer switch, a releasable clutch connection between said clock motor and said timer switch, and connecting means between each time selector control device and said timer switch; cycle starting means including a starting switch operable by said clock motor; and a control circuit interconnecting said cyclically operable means, timing means and starting means, whereby actuation of said starting switch initiates operation of said driving motor to establish a holding circuit for said driving motor through said station selector dial until a valve operating position is reached, whereupon said driving motor is deenergized and said clutch establishes a driving connection between said clock motor and said timer switch, said timer switch being effective to again energize the driving motor to disengage the clutch and to advance the cyclically operable means to the next valve operating position.

4. A control system as defined in claim 3, in which the timing means includes a daily program dial and a calendar dial, driven from said clock motor, said dials including cooperating selectively positionable operating members for actuating said starting switch.

5. A control system as defined in claim 3, in which said timing means includes a daily program dial and a calendar dial, each of said dials including a series of axial openings having open ends and being adapted to receive removable pins, the openings in at least one of said dials including a portion, spaced from the ends, having an enlarged diameter.

6. A control system as defined in claim 5, including pins received within one or more of said openings, each of said pins comprising a cylindrical shank, said shank having a portion of a diameter greater than the diameter of the remainder of the shank lockingly received within said enlarged diameter portion of said openings in said disk.

7. A control system as defined in claim 3, in which said timing means includes a daily program dial and a calendar dial driven from said clock motor; a support, said dials being mounted on said support in closely spaced relation, each of said dials having a series of pin-receiving openings adjacent its periphery, said starting switch being mounted on said support and including an operating member, and actuating means connected with said operating member and disposed in the path of movement of the pins in said dials, and operable jointly by a pin in each dial to actuate said starting switch.

8. A control system as defined in claim 7, in which said actuating means comprises a first resilient arm carried by said support and a second resilient arm carried by said starting switch, said first arm including a first cam surface disposed in the path of movement of a first pin carried by said calender dial and a second cam surface disposed in the path of movement of a second pin carried by said daily program dial, said cam surfaces being arranged to cause movement of said first arm by said first and second pins in the same direction, and said second arm engaging said switch operating member and including a cam surface disposed adjacent the second cam surface on said first arm, whereby said second pin carried by said daily program dial passes between said adjacent cam surfaces to move said arms in opposite directions, said cam surface on said second arm being disposed so that, upon movement of the second pin, the cam surface on said second arm rides off the second pin before the second cam surface on said first arm rides off said second pin, whereby said second arm is resiliently urged toward a position to effect actuation of said switch operating member.

9. A control system as defined in claim 3, in which said timing means includes a daily program dial and a calendar dial, a driving connection between said clock motor and said daily program dial including a one-way clutch; and a knob connected with said daily program dial to facilitate manual setting of the same.

10. A control system as defined in claim 3, in which said driving connection between said clock motor and said timer switch includes planetary gearing, and in which said clutch is operable to fix one member of such gearing against rotation.

11. A control system as defined in claim 3, in which said timer switch includes a rotary contact element and a series of spaced terminals disposed to be engaged by said rotary contact element at predetermined intervals of time, said clutch, when energized, establishing a driving connection between said clock motor and said rotary contact element, a stop member disposed in the path of movement of said rotary contact element and defining a starting position therefor, and resilient means urging said contact element toward said stop member and being effective to move said contact element against said stop member when said clutch is deenergized.

12. A control system as defined in claim 11, in which said stop member is adjustable to vary the timing of said timer switch.

13. A control system as defined in claim 3, in which said control circuit interconnecting said time selecting control devices and said cyclically operable means includes a printed circuit.

14. A control system as defined in claim 3, in which said means to sequentially operate said flow control valves includes a fluid pressure controlled member connected with each valve, and a rotary pilot valve driven from said driving motor and having fluid connection with said pressure controlled members.

15. A control system as defined in claim 3, in which said means to sequentially operate said valves includes a solenoid connected with each valve, and a rotary switch, driven from said driving motor, and having operating connections with said solenoids.

16. A control system as defined in claim 3, including a master valve in said supply conduit, and means, under the control of said cyclically operable means, to open said master valve at the beginning of a cycle of operation of said system and to close said master valve at the end of a cycle.

17. A control system as defined in claim 3, in which said driving connection from said driving motor to said driven station selector dial, rotary switch and valve operating means includes a shaft driven by said driving motor, a hollow shaft connected with said driven members, said motor shaft being received within said hollow shaft and staked therewith.

18. A control system as defined in claim 3, in which said means to sequentially operate said valves includes a fluid pressure controlled member connected with each valve, a rotary pilot valve, driven from said driving motor, having fluid connections with said pressure actuated members, and an interceptor valve including a connection with said pilot valve, a connection with a source of pressure fluid and a connection with a drain, to effect closing of any flow control valve which, under the control of the pilot valve, would otherwise be in an open position.

19. A control system as defined in claim 18, including means, responsive to failure of electrical power, to effect operation of said interceptor valve to effect closing of any open flow-control valve.

20. A control system as defined in claim 18, including a precipitation sensing means, and control means, interconnecting said precipitation sensing means and said interceptor valve, and effective in response to a predetermined minimum precipitation, to prevent opening of all flow control valves independently of the operation of said cyclically operable means.

21. A control system as defined in claim 3, in which said means to sequentially operate said flow control valves includes a fluid pressure controlled member connected with each valve, a rotary pilot valve, driven from said driving motor, having fluid connections with said pressure controlled members, a temperature sensing means disposed to sense the ambient temperature around the control system, a heating element disposed in heat exchange relation with said fluid connections, and means connecting said heating element with said temperature sensing means, said temperature sensing means being operable, in response to a predetermined temperature, to energize said heating element, to prevent freezing in said system.

22. A control system as defined in claim 3, in which said means to sequentially operate said flow control valves includes a fluid pressure controlled member connected with each valve, and a rotary pilot valve, driven from said driving motor, having fluid pressure connections with said pressure actuated members, said pilot valve including a tube plate receiving said connections, a distribution plate and a gasket between said tube plate and distribution plate, said tube plate including a plurality of apertures disposed on a pair of concentric rings, each ring having the same number of apertures, the apertures in one ring being radially staggered relative to the apertures in the other ring, said distribution plate including an equal number of apertures with their inlets disposed on a single ring having a diameter smaller than the outer ring of apertures in said tube plate, said gasket having an equal number of apertures consisting of circular ports and radially elongated slots, said circular ports being disposed on an inner ring and interconnecting the apertures in the inner ring in the tube plate and one set of alternate apertures in the ring in said distribution plate, said slots being disposed in an outer ring interconnecting the apertures in the outer ring in the tube plate and the other set of alternate apertures in said ring in the distribution plate, the ports and slots being radially staggered, and a disk rotatable relative to said distribution plate, said disk including apertures cooperating with the apertures in said distribution plate.

23. A control system as defined in claim 22, in which one set of alternate apertures in said distribution plate extends axially from inlet to outlet, and in which the other set of alternate apertures extends diagonally in an axial and radially outward direction from inlet to outlet, whereby the outlet ends from said alternate sets of apertures are disposed on two pairs of concentric circles and connect with said circular ports and said elongated slots in said gasket.

24. A control system as defined in claim 3, in which said valves are normally closed, and said means to sequentially operate said valves includes a fluid pressure controlled member connected with each valve to effect opening thereof; a rotary pilot valve, driven from said pilot motor, having fluid connections with said pressure actuated members, and an interceptor valve including a connection with said pilot valve, a connection with a source of pressure fluid and a connection with a drain, to effect closing of any flow control valve which, under the control of the pilot valve, would otherwise be in an open position.

25. A control system for a water distribution system having a water supply pipe, and a plurality of branch conduits connected therewith, and a flow control valve in each branch conduit, comprising: cyclically operable means to open and close said flow control valves in a predetermined sequence, said means including a motor; a timing means, including a separate time selector control device associated with each valve, to selectively set the duration of the period that its associated valve remains open, said timing means being structurally independent of said cyclically operable means, and means operably connecting said timing means with said cyclically operable means, including an electrical connection between said timing means and said motor to initiate operation of the motor of said cyclically operable means.

26. A control system for a water distribution system having a water supply pipe, and a plurality of branch conduits connected therewith, and a flow control valve in each branch conduit, comprising: cyclically operable means to open and close said flow control valves in a predetermined sequence, said means including a motor; a timing means, including a separate time selector control device associated with each valve, to selectively set the duration of the period that its associated valve remains open, said timing means being structurally independent of said cyclically operable means and including: a motor; a daily program disk; and a calendar disk, each disk having means to removably receive switch operating members positioned at selected hours and days on said disks; switch means, operable jointly by an operating member in said daily program disk and an operating member in said calendar disk; and means operably connecting said timing means with said cyclically operable means, including an electrical connection between said switch means and said motor of said cyclically operable means, to initiate a cycle of operation of said cyclically operable means.

27. A control system for a water distribution system having a water supply pipe, and a plurality of branch conduits connected therewith, and a flow control valve in each branch conduit, comprising: cyclically operable means to open and close said flow control valves in a predetermined sequence, said cyclically operable means including: a motor; a first means, operable by said motor, to sequentially open and close said flow control valves; and a second means operable by said motor, to sequentially provide an electrical connection with an associated time control means; and a timing means, including a separate time selector control device associated with each valve, to selectively set the duration of the period that its associated valve remains open, said timing means including: a motor-operated timer switch; and a connection from said switch to each time selector control device associated with each valve, to selectively set the duration of the period that its associated valve remains open, whereby the operation of said motor of said cyclically operable means is controlled by said timer switch, said timing means being structurally independent of and operably connected with said cyclically operable means.

References Cited in the file of this patent

UNITED STATES PATENTS

| | | |
|---|---|---|
| 2,614,183 | Moutinho | Oct. 14, 1952 |
| 2,821,434 | Hunter | Jan. 28, 1958 |
| 2,866,021 | Hildum | Dec. 23, 1958 |
| 2,875,428 | Griswold | Feb. 14, 1959 |
| 2,878,824 | Swanson | Mar. 24, 1959 |
| 2,884,006 | Hoback | Apr. 28, 1959 |
| 2,895,493 | Edwards | July 21, 1959 |
| 2,918,938 | Kimball | Dec. 29, 1959 |
| 2,951,918 | Steffen | Sept. 6, 1960 |
| 2,953,938 | Bush | Sept. 27, 1960 |
| 2,969,693 | Immel | Jan. 31, 1961 |
| 2,986,167 | Griswold | May 30, 1961 |
| 2,992,299 | Saunders | July 11, 1961 |
| 3,000,398 | Link | Sept. 19, 1961 |

UNITED STATES PATENT OFFICE
CERTIFICATE OF CORRECTION

Patent No. 3,140,720                                                   July 14, 1964

Lee M. Griswold

It is hereby certified that error appears in the above numbered patent requiring correction and that the said Letters Patent should read as corrected below.

Column 5, line 18, for "FIG. 26" read -- FIG. 25 --; line 35, for "beenath" read -- beneath --; line 50, for "wire" read -- wiring --; column 6, line 42, for "adapated" read -- adapted --; line 71, for "O shaped" read -- D shaped --; column 9, line 29, for "iner" read -- inner --; line 56, for "seleve" read -- sleeve --; column 15, line 75, strike out "is"; column 18, line 20, for "control 50" read -- control devices 50 --.

Signed and sealed this 24th day of November 1964.

(SEAL)
Attest:

ERNEST W. SWIDER                                          EDWARD J. BRENNER
Attesting Officer                                            Commissioner of Patents